US012259228B2

(12) United States Patent
Cunningham et al.

(10) Patent No.: US 12,259,228 B2
(45) Date of Patent: *Mar. 25, 2025

(54) FIBER OPTIC SENSOR NETWORK FOR SUBSURFACE IMPACT PROTECTION SYSTEM

(71) Applicant: Saudi Arabian Oil Company, Dhahran (SA)

(72) Inventors: Vincent Cunningham, Thuwal (SA); Iqbal Hussain, Birmingham (GB)

(73) Assignee: Saudi Arabian Oil Company, Dhahran (SA)

( * ) Notice: Subject to any disclaimer, the term of this patent is extended or adjusted under 35 U.S.C. 154(b) by 152 days.

This patent is subject to a terminal disclaimer.

(21) Appl. No.: 17/236,623

(22) Filed: Apr. 21, 2021

(65) Prior Publication Data

US 2022/0341729 A1    Oct. 27, 2022

(51) Int. Cl.
| | | |
|---|---|---|
| *G01B 11/16* | (2006.01) | |
| *G01M 3/04* | (2006.01) | |
| *G02B 6/44* | (2006.01) | |

(52) U.S. Cl.
CPC ............. *G01B 11/18* (2013.01); *G01M 3/047* (2013.01); *G02B 6/4459* (2013.01)

(58) Field of Classification Search
CPC ......... G01B 11/18; G01M 3/047; G01M 3/24; G01M 11/086; G02B 6/4459; G01D 5/35374; G01D 5/35316

See application file for complete search history.

(56) References Cited

U.S. PATENT DOCUMENTS 5,026,141 A  *  6/1991  Griffiths ................. G01B 11/18
                                                       385/13
5,413,149 A  *  5/1995  Ford ........................ D03D 3/02
                                                       428/36.1

(Continued)

FOREIGN PATENT DOCUMENTS

CA          1305795 C       7/1992
CA          2305148 A1      4/1999

(Continued)

OTHER PUBLICATIONS

International Search Report and Written Opinion in Corresponding PCT Application No. PCT/US2020/064849 mailed Mar. 31, 2021. 9 pages.

(Continued)

*Primary Examiner* — Hwa Andrew Lee
(74) *Attorney, Agent, or Firm* — Leason Ellis LLP

(57) ABSTRACT

A subsurface impact protection system for protecting an underground asset is provided. The protection system includes a subsurface polymer layer provided above the asset to prevent impact forces from reaching the asset. A sensor network is embedded in the polymer layer. The sensor network comprises optical fibers each including one or more fiber optic sensors. The optical fibers receive an input signal from a source and transmit it through the fiber. At the output end of the fiber is an optical detector that measures light properties of the output optical signal indicative of environmental conditions near the polymer layer. The sensor network transmits a signal including measured light or environmental parameters to a monitoring computing system. In some embodiments, the polymer layer includes a protective mesh made up of a plurality of high density polyethylene strands in a woven pattern. A method of protecting an underground asset is also provided.

18 Claims, 16 Drawing Sheets

(56) References Cited

U.S. PATENT DOCUMENTS

| | | | |
|---|---|---|---|
| 5,680,489 A * | 10/1997 | Kersey | G01M 11/086 385/12 |
| 6,999,021 B2 | 2/2006 | Taylor, Jr. et al. | |
| 6,999,641 B2 * | 2/2006 | Williams | G01D 5/35354 385/5 |
| 8,106,763 B2 | 1/2012 | Otterbach | |
| 8,199,317 B2 | 6/2012 | Habel et al. | |
| 8,316,694 B2 | 11/2012 | Artieres et al. | |
| 8,451,013 B1 * | 5/2013 | Hsiao | B29C 70/54 324/609 |
| 9,607,301 B2 * | 3/2017 | Gaudiana | G06Q 30/00 |
| 9,909,708 B1 | 3/2018 | Penland, Jr. | |
| 10,436,667 B2 | 10/2019 | Littlestar | |
| 10,649,112 B2 * | 5/2020 | Shoemaker | G01R 33/18 |
| 10,856,056 B2 | 12/2020 | Ham | |
| 10,861,328 B2 * | 12/2020 | Gonçalves | G08G 1/052 |
| 11,143,610 B2 * | 10/2021 | Park | G01D 5/12 |
| 11,460,142 B2 * | 10/2022 | Cunningham | G01M 5/0091 |
| 2001/0023614 A1 | 9/2001 | Tubel et al. | |
| 2008/0127598 A1 * | 6/2008 | Kallstrom | F41H 5/0485 52/656.7 |
| 2009/0092352 A1 * | 4/2009 | Ng | G01M 11/086 385/13 |
| 2010/0227557 A1 | 9/2010 | Won | |
| 2013/0118247 A1 | 5/2013 | Akbari et al. | |
| 2014/0159550 A1 | 6/2014 | O'Bryan et al. | |
| 2015/0284932 A1 * | 10/2015 | Johnson | E02F 5/145 405/174 |
| 2018/0180753 A1 | 6/2018 | Rajeev et al. | |
| 2019/0016065 A1 * | 1/2019 | Jia | B29C 70/443 |
| 2020/0393217 A1 * | 12/2020 | Adrain | E06B 9/40 |
| 2021/0180737 A1 * | 6/2021 | Cunningham | H04Q 9/00 |

FOREIGN PATENT DOCUMENTS

| | | | |
|---|---|---|---|
| CN | 2136382 Y | 6/1993 | |
| CN | 101842720 A | 9/2010 | |
| CN | 201774212 U | 3/2011 | |
| CN | 103712067 A | 4/2014 | |
| KR | 960022185 A | 7/1996 | |
| KR | 1030350 B1 * | 4/2011 | |
| KR | 101529563 B1 | 6/2015 | |
| WO | WO-2005083379 A1 * | 9/2005 | G01K 11/32 |
| WO | 2017099751 A1 | 6/2017 | |

OTHER PUBLICATIONS

Da Silva, Agnelo Rocha, Mahta Moghaddam, and Mingyan Liu. "The future of wireless underground sensing networks considering physical layer aspects." The Art of Wireless Sensor Networks. Springer, Berlin, Heidelberg, 2014. 451-484.

Toma, Daniel Mihai, Joaquin del Rio, and Antoni Manuel-Lazaro. "Self-powered high-rate wireless sensor network for underground high voltage power lines." 2012 IEEE International Instrumentation and Measurement Technology conference Proceedings. IEEE, 2012.

Artieres et al., "Six years earthworks monitoring with a fibre optics geotextile enabled sensor." TenCate Geosynthetics. 15 pages, (2021).

Skelly and Loy Offers TenCate GeoDetect, Skelly and Loy, Inc., skellyloy.com/resources/Brochures/Tencate-GeoDetect2.pdf. 8 pages, (2021).

Staff, Sensors. "TenCate and Roctest Create Geotextile Monitoring System." FierceElectronics, Mar. 17, 2010, www.fierceelectronics.com/components/tencate-and-roctest-create-geotextile-monitoring-system. 6 pages.

Harvie, Wilson B et al., "Sensor-Enabled Geosynthetics Monitoring Stability and Leak Detection in Earthen Construction Technical Paper # 159." (2013). 10 pages.

* cited by examiner

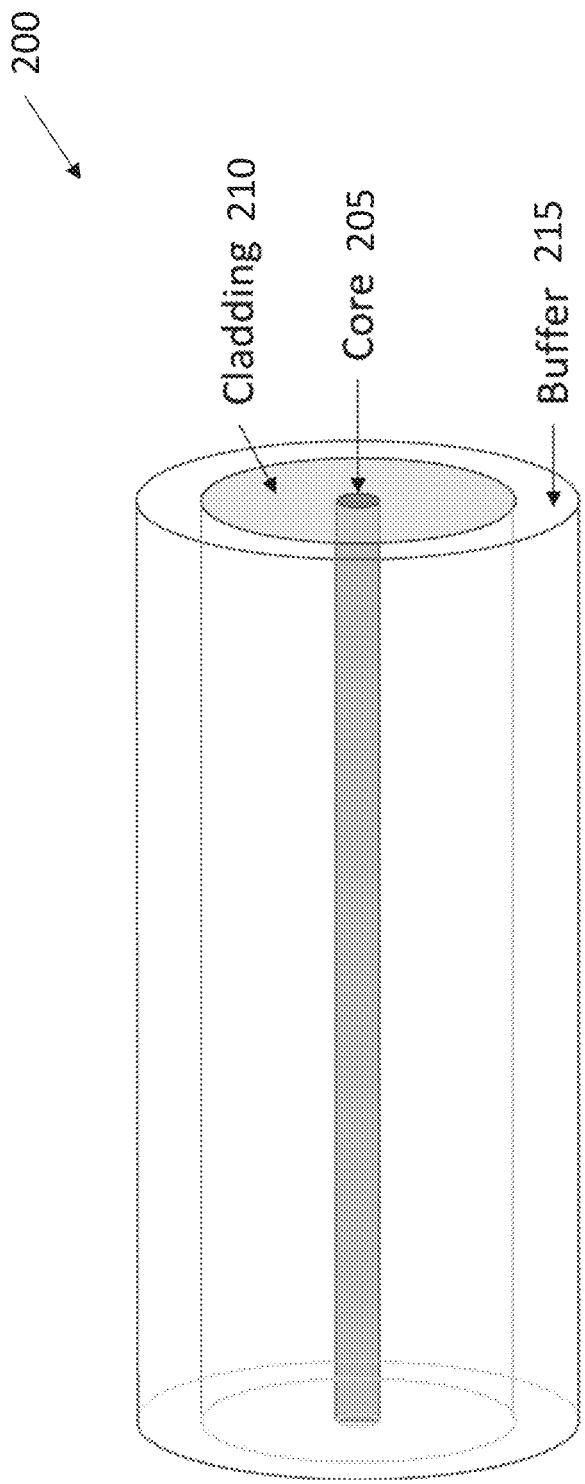

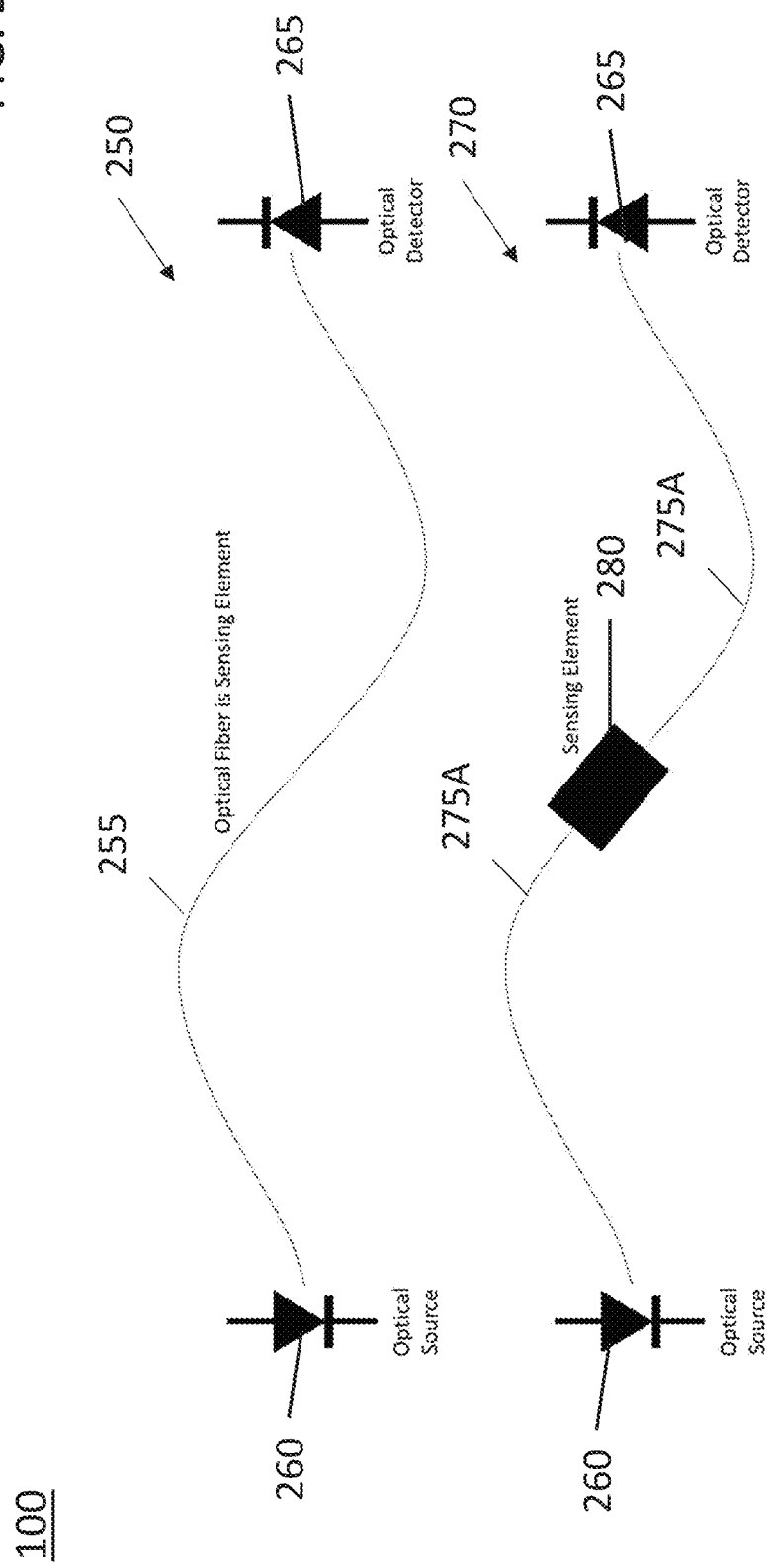

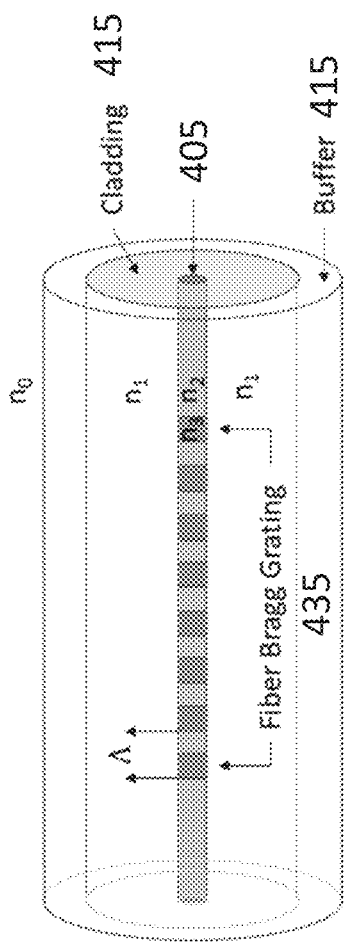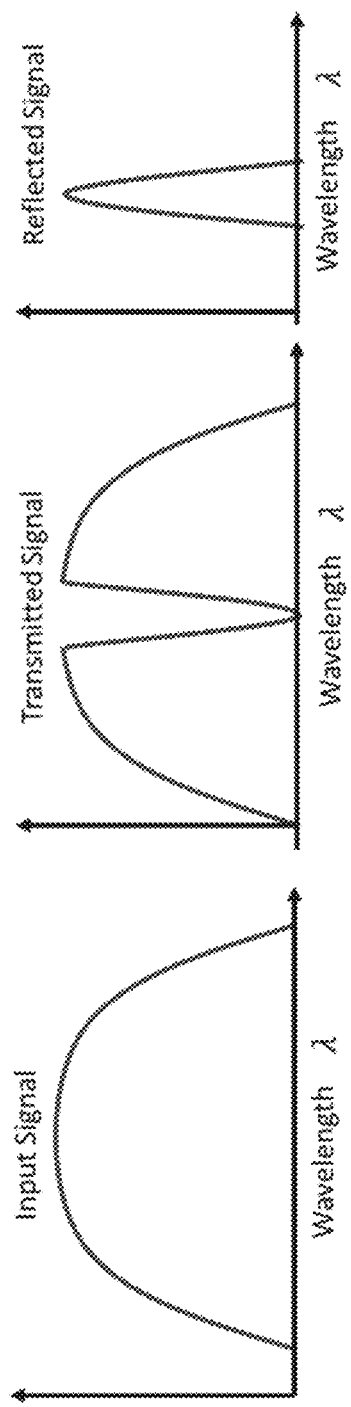
FIG. 4

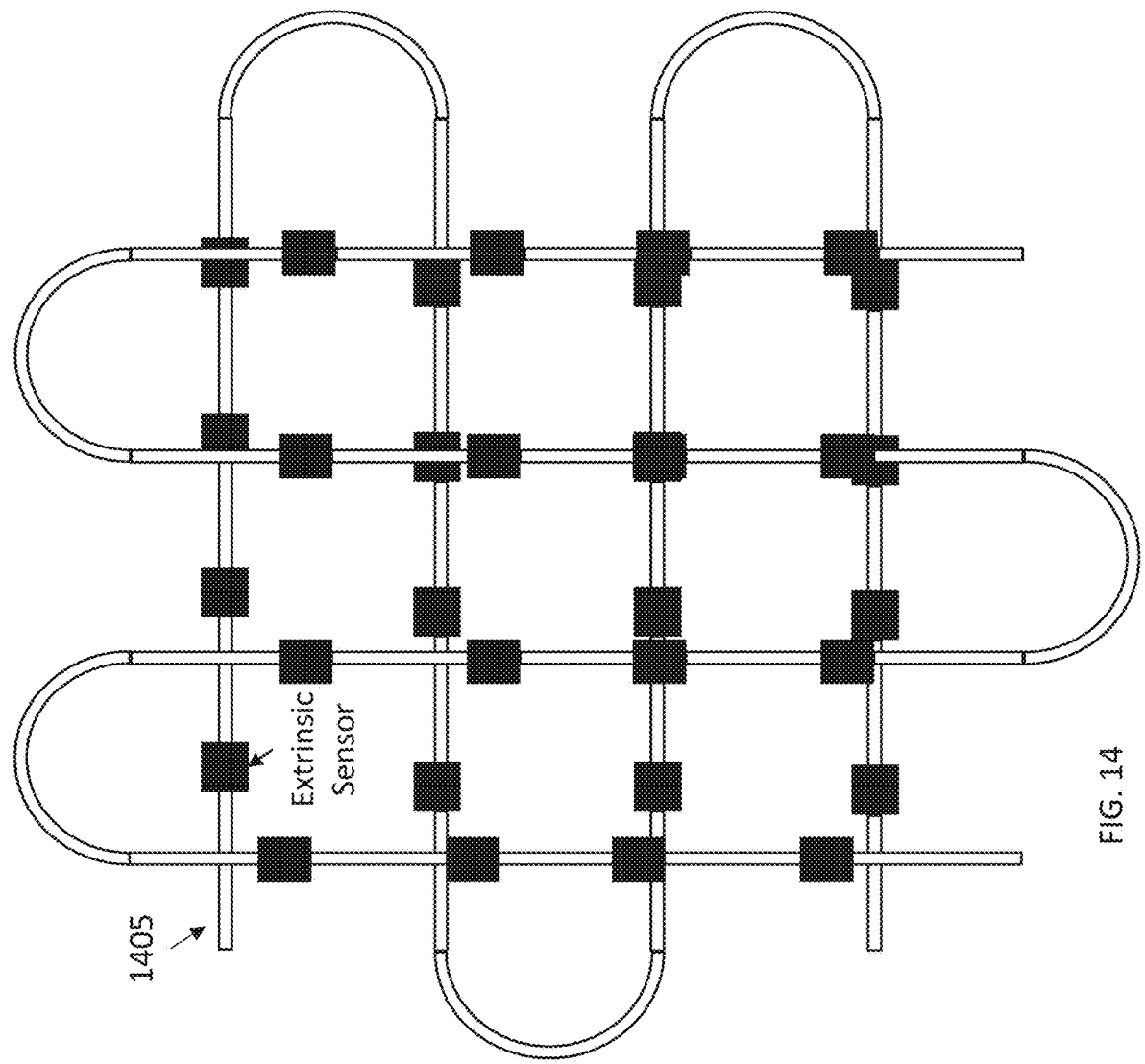

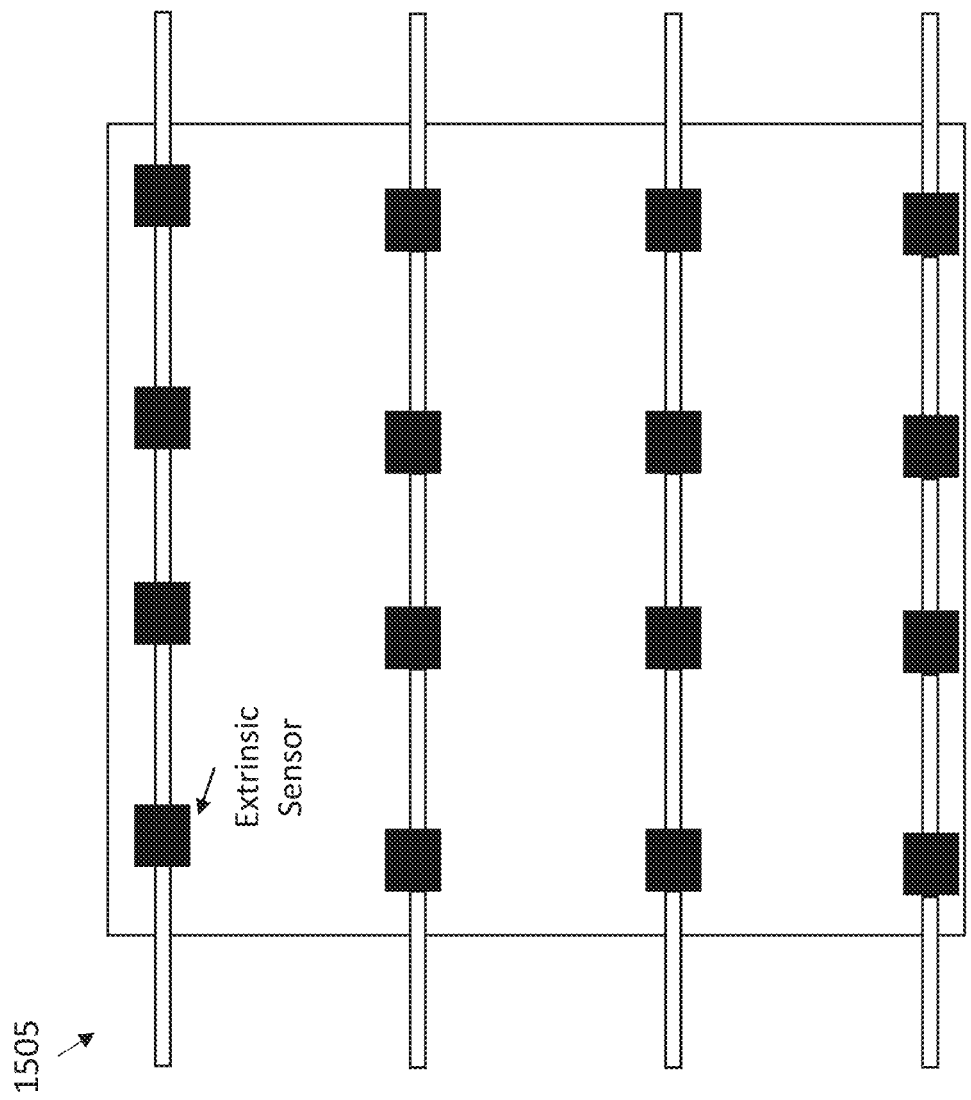

FIBER OPTIC SENSOR NETWORK FOR SUBSURFACE IMPACT PROTECTION SYSTEM

FIELD OF THE DISCLOSURE

The present disclosure relates generally to a sensor network, and specifically to a sensor network for monitoring in an around a subsurface impact protection system and the underground assets protected by the impact protection system.

BACKGROUND OF THE DISCLOSURE

The encroachment of existing buried high-pressure pipeline corridors and storage vessels due to factors such as above-ground building and construction activities presents a high risk to the integrity of the underground pipelines and vessels. This can result in a loss of product from leaks in the underground structures caused by external damage, which can lead to health, safety, and environmental issues. The protection of buried pipeline networks from impact damage is important to operators of the pipelines and other third parties that have a vested interest where encroachment is taking place.

It is in regard to these and other problems in the art that the present disclosure is directed to provide a technical solution for an effective sensor network for monitoring in an around a subsurface impact protection system.

SUMMARY OF THE DISCLOSURE

According to an embodiment, a subsurface impact protection system for protecting an underground asset is provided.

The subsurface impact protection system comprises a subsurface polymer layer above the underground asset and configured to absorb above-ground impact force from reaching the underground asset. The impact protection system further comprises a sensor network. More specifically, the sensor network comprises one or more optical sources, one or more optical detectors and optical fibers embedded in the polymer layer. Each optical fiber among the optical fibers comprises an input end coupled to an optical source, which is configured to provide an optical input signal to the input end. Each optical fiber also comprises an output end coupled to an optical detector among the one or more optical detectors, wherein the optical detector is configured to detect an output optical signal from the output end and measure a light property of the output optical signal. Additionally, the optical fiber also includes a fiber-optic sensor provided between the input end and the output end. In particular, the fiber optic sensor is configured to modulate the light property of the output optical signal relative to the light property of the input optical signal as a function of a condition at the fiber optic sensor. Furthermore, the optical detector is configured to generate a sensor signal based on the light property measured According to an embodiment, a method of protecting an underground asset using a subsurface impact protection system is provided. The method comprises the step of providing a subsurface impact protection system below a surface of the ground and above the underground asset.

In particular, the subsurface impact protection system comprises a subsurface polymer layer above the underground asset and configured to absorb above-ground impact force from reaching the underground asset and a sensor network. More specifically, the sensor network comprises one or more optical sources, one or more optical detectors and optical fibers embedded in the polymer layer. Each optical fiber among the optical fibers comprises an input end coupled to an optical source which is configured to provide an optical input signal to the input end. Each optical fiber also comprises an output end coupled to an optical detector among the one or more optical detectors, wherein the optical detector is configured to detect an output optical signal from the output end and measure a light property of the output optical signal. Additionally, the optical fiber also includes a fiber-optic sensor provided between the input end and the output end. In particular, the fiber optic sensor is configured to modulate the light property of the output optical signal relative to the light property of the input optical signal as a function of a condition at the fiber optic sensor. Furthermore, the optical detector is configured to generate a sensor signal based on the light property measured for the optical fiber and representing the condition at the fiber optic sensor.

The method further includes the step of monitoring the polymer layer using the sensor network. The monitoring includes steps for generating, using the one or more optical detectors monitoring the optical fibers sensors, a corresponding plurality of sensor signals of conditions respectively at the fiber optic sensors of the optical fibers and transmitting the generated sensor signals to one or more external monitoring computing systems.

These and other aspects and features can be appreciated from the following description of certain embodiments together with the accompanying drawings and claims.

BRIEF DESCRIPTION OF THE DRAWINGS

FIG. 2A is an illustration of an example optical fiber for use in a subsurface impact protection system, according to an embodiment;

FIG. 2B is a circuit diagram illustrating two exemplary fiber optic sensor configurations for use in a subsurface impact protection system, according to an embodiment.

FIG. 4 is a side-view diagram illustrating an exemplary fiber optic sensor for use in a subsurface impact protection system, according to an embodiment.

FIG. 14 is a top-view diagram of a sensor network including extrinsic sensors according to an embodiment.

FIG. 15 is a top-view diagram of a sensor network including extrinsic sensors according to an embodiment.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1:
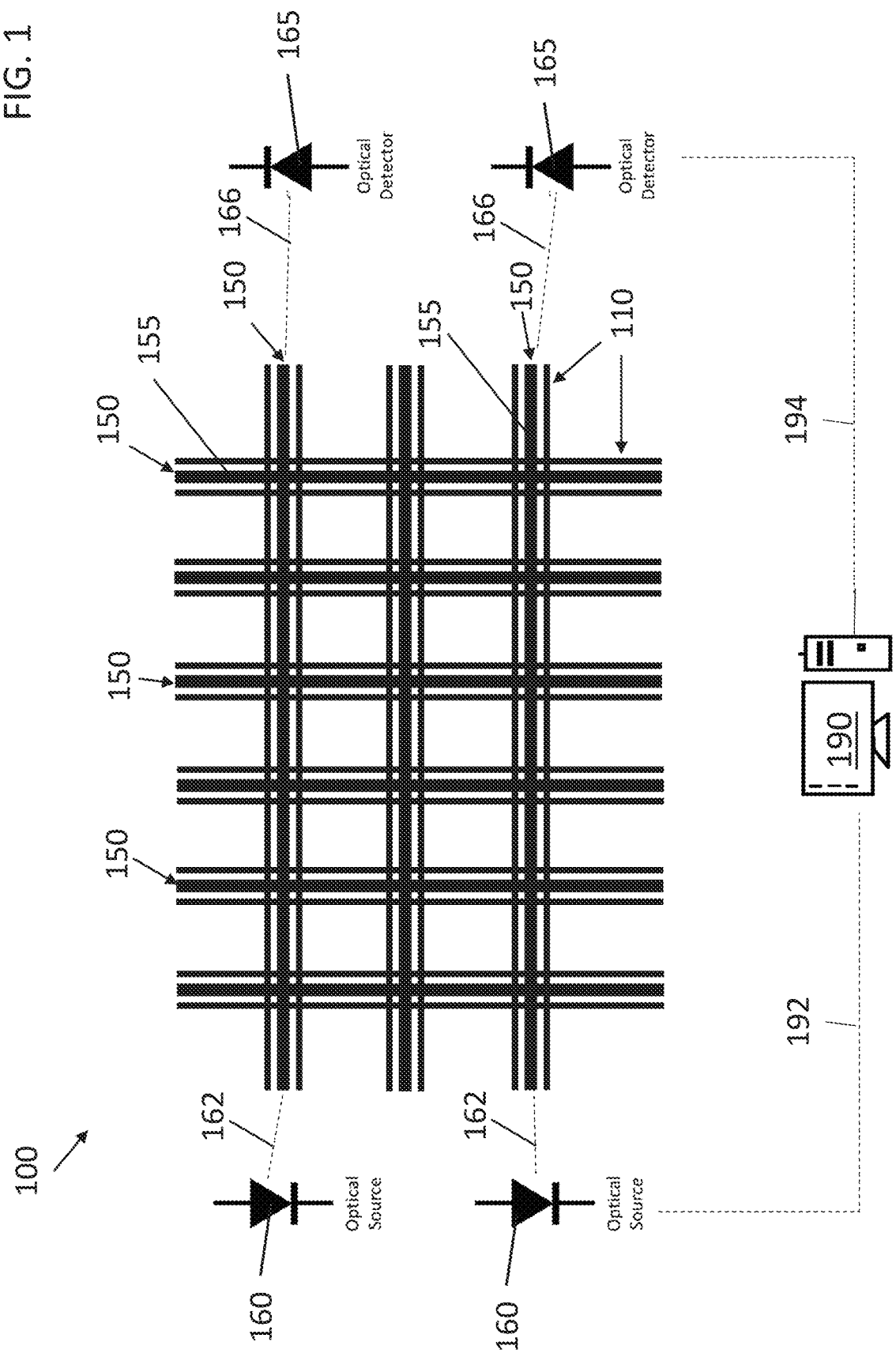
FIG. 1 is an illustration of an example sensor network embedded in a polymer layer (e.g., a mesh or plate structure) of a subsurface impact protection system, according to an embodiment.

In various example embodiments, a subsurface impact protection system including a fiber optic sensor network is provided. The subsurface impact protection system is used to protect buried or subsurface infrastructure (e.g., pipelines, storage vessels, or the like) from above-ground impact damage. The sensor network provides a way to actively monitor the protection system and the protected infrastructure below it. The protection layer can be fabricated, for example, in a mesh or plate structure of thermoplastic polymer, such as high-density polyethylene (HDPE), above the underground structure to be protected (and below the surface of the ground). The HDPE mesh or plate structure is used in lieu of concrete slabs to protect the underground structure. This HDPE mesh or plate structure is more cost effective and provides the same level of protection as the concrete slabs. The HDPE mesh or plate structure also effectively shields the underground structure and protects it from above-ground impact damage.

In some embodiments, sensing devices (that make up the sensor network) are incorporated in the HDPE mesh or plates. The sensing devices monitor and inspect the buried assets that make up the underground structure. The sensors provided within the protection system comprises fiber optic sensors.

The thermoplastic polymer is the ideal platform for embedding of a fiber optic sensor network in the protective structure to provide information on its structural integrity and other parameters/variables which can be used to infer the health of the asset under protection and its surrounding underground environment. The fiber optic sensor can also be made to measure several parameters such as, but not limited to, strain, pressure, temperature, rotation, acceleration, pH, humidity and corrosion.

According to a further aspect, the exemplary methods for installing the protective system under development makes use of a subsurface delivery system to deliver the impact protection system above the asset to be protected (and below the surface of the ground).

As discussed earlier, there are a number of problems associated with protecting underground structures, such as buried pipelines and storage vessels. Two ways of protecting buried pipelines from above-ground impact damage are by either increasing the pipe thickness or by using heavy duty concrete slabs over the pipeline. Both methods have drawbacks, for example, in that they are labor intensive and costly, require significant earth removal (trenching), and result in heavier underground structures.

Accordingly, in example embodiments, a fiber optic sensor network (or simply "sensor network") for a subsurface impact protection system is provided. The sensor network includes sensing devices that inspect and monitor different conditions or parameters, such as but not limited to, strain, pressure, temperature, rotation, acceleration, pH, humidity and corrosion or the like, near the impact protection system. The sensor network is capable of identifying abnormal behavior of buried assets (such as pipelines or storage vessels) being protected by the subsurface impact protection system. For instance, the sensor network includes programmable, reconfigurable, or custom logic or circuits configured (e.g., programmed or otherwise designed) to carry out the intended sensing or other control tasks (such as identifying any abnormal behavior). The sensing devices are part of a mesh or plate structure of HDPE making up the protection system. For ease of description, the protection system will usually be described as being made up of a mesh (e.g., woven strands) of HDPE or other polymers, though other embodiments are not necessarily so limited. For example, in some other embodiments, a HDPE (or other polymer) plate structure makes up the protection system.

The sensing devices make up a sensor network embedded in (e.g., part of, directly or closely attached to, or surrounded by) the protective mesh. The protective mesh is for the protection of underground assets (e.g., pipelines, storage vessels, and other structures). The sensor network provides information on the structure or integrity of the mesh. The protective mesh provides a platform for efficient installation of the sensor network. The protective mesh provides the ideal localization of the sensors. The protective mesh provides the ideal depth position of the sensors. The sensors and their data help infer the health of the asset(s) under protection and their surrounding underground environment. These sensing devices can include, for example, pressure sensors, temperature sensors, and humidity sensors, to name a few.

In some embodiments, one or more fiber optic sensors of the sensor network can be configured to measure the pressure on the mesh from external forces (e.g., stress and strain caused by weight on the external surface). The sensor network also measures shifts in ground movements as well as subsurface collapse, which would result in a measurable change of pressure on the mesh. More specifically, the pressure sensor can be realized using the fiber optic as the sensing element (i.e., an intrinsic sensor configuration). If there is a change in pressure on the fiber this will cause the fiber to change in length where this increases the path length for the light passing therethrough. In this case, an interferometric detection setup can be used to measure the phase difference (i.e., how much the light has to additionally travel). Alternatively a fiber Bragg grating can be used, and in such a configuration, the change in length due to the pressure will measurably affect the wavelength of the emerging light. In addition or alternatively, the pressure sensors can be realized using an extrinsic type sensor configuration.

In some embodiments, one or more fiber optic sensors of the sensor network can be configured to measure stress on the mesh, this can correlate to the stress and strain on the protected asset (stress and strain can come from ground movements or impact on ground surface or subsurface collapse). This may be referred to as structural health monitoring of the mesh and the buried asset.

More specifically, the stress and strain sensors can be realized using the fiber optic as the sensing element, similar to the exemplary pressure sensor configuration described above. Additionally, arranging fiber Bragg gratings in different orientations within the mesh can provide a better indication of directionality and thus the type of stress and strain. By way of further example, and as further described in connection with FIG. 3, the fiber can be embedded in the mat between micro-benders, which are arranged above and below the fiber and have opposing surfaces with complementary profiles (e.g., periodic peaks/troughs or protrusions), configured to mechanically bend the fiber as a result of a force urging the opposing micro-benders together.

In some embodiments, one or more fiber optic sensors of the sensor network can be configured to monitor temperature of mesh. While a change in temperature can be due to seasonal temperature changes, however an abrupt or unexpected change sensed by the sensor can be used infer a change in the surrounding temperature caused by a leak or abnormal behavior of the protected asset.

In an exemplary configuration, the temperature sensor is realized using the fiber as the sensor. This can be done several ways. In one example, the fiber or fiber mesh can be coated by a material that reacts to temperature (e.g., metal that predictably expands and contracts with temperature), this in turn will change the length of the fiber and the resulting phase change would be due to temperature. Intrinsically, this can again be carried out using a Bragg grating where the grating changes in period due to temperature causing a change in the spectral output. A combination of both could be used to enhance the output as well. The Bragg wavelength is related to temperature change delta T as shown in the following equation:

$$\Delta \lambda_g = 2n \wedge \left( \left\{ 1 - \left( \frac{n^2}{2} \right)(P_{12} - \nu(P_{11} + P_{12})) \right\} \varepsilon + \left\{ \alpha + \frac{1}{n} \frac{\partial n}{\partial T} \right\} \Delta T \right)$$

In some embodiments, one or more fiber optic sensors of the sensor network can be configured to measure and monitor humidity of surrounding area. Similar to temperature, humidity changes can be associated with seasonal changes and thus the monitoring system can be configured to filter out or ignore such changes. However, the monitoring system can be configured to detect an abrupt or unexpected change in humidity measured by the sensor and to infer a change in the liquid content surrounding the asset caused by a leak in the protected asset.

More specifically, the humidity sensors can be realized using the fiber as the sensor. It is a known fact that a large portion of the light through a fiber travels through the cladding as well as the core, the difference in refractive index between the cladding and the outside world is still sufficient to cause total internal reflection. However, when moisture is on the cladding the refractive index changes as light travels into the water. The measurement of the humidity can thus be taken as the change in intensity (e.g., the light lost in the moisture). This can be particularly pronounced at areas where there are bends in the fiber.

In some embodiments, one or more fiber optic sensors of the sensor network can be configured to measure vibration from seismic activities. Accordingly, vibration sensing can be used to detect above surface fluctuations in pressure (e.g., from increased traffic) or subsurface vibrations which may also come from the pipe and flow of liquid in the pipe. Vibrational sensors can be configured to monitor activities resulting from leaks and the measurements can also be used by the monitoring system to infer if the buried asset is prone to vibration induced fatigue and mechanical strain. In some embodiments, a single fiber of the fiber optic sensor network can be configured to incorporate different sensors used to measure different parameters.

More specifically, in an exemplary configuration, the vibration sensors can be realized using the fiber optic as the sensing element (i.e., an intrinsic sensor configuration) similar to the exemplary pressure sensor configuration described above. However, in this configuration, the signature signal at the output would be periodic in line with the vibration. In the case of a leak, the vibration caused by the leaks (e.g., from escaping water or gas) can be correlated with the pressure signal.

In some embodiments, the sensor network includes gas leak sensors for use with pipelines and storage vessels that house or transport gases (with or without liquids). The gas leak sensors are configured to detect gas or elements of gas. A detection of an unexpected gas can be due, for example, to a leak in the pipeline network or vessel.

More specifically, in an exemplary configuration, the leak sensors can be realized using the fiber optic as the sensing element. Other existing sensor configurations can include two fiber segments separated by a chamber such that the light is traveling along the first fiber, entering the chamber and exiting into another fiber and wherein gas in the chamber absorbs the light creating a measurable change in intensity or spectrum at the second fiber.

In some embodiments, the sensor network comprising one or more fiber optic sensors is configured to provide assisted navigation and location functions, such as with respect to the protective mesh or the assets being protected. For example, the sensor network can be programmed or otherwise configured to provide assisted navigation of the assets being protected along with location identification of the buried assets. This can help facilitate and aid with future maintenance or repair (such as emergency repair) programs of the mesh or the buried assets.

More specifically, in an exemplary configuration, the sensor network includes one or more control circuits programmed (or otherwise configured) to pinpoint the location of areas of concern by measuring time of flight through the fiber and analyzing the reflected signals using an optical time domain reflectometer (OTDR).

In some embodiments, the sensor network comprising one or more fiber optic sensors is configured to provide security services (such as with security sensors) to protect the buried assets. For example, in one such embodiment, the sensor network includes one or more control circuits programmed (or otherwise configured) to monitor the optical signal of the sensor network and, if there is a change in intensity or spectral output that deviates from normal behavior, in a short period of time provide an alarm or alert indicating a possible breach of security on the protected asset or assets. This is useful for high priority or strategic buried assets or critical buried infrastructure (e.g. strategic pipeline networks).

In some embodiments, the sensor network comprising one or more fiber optic sensors is configured to measure or otherwise sense the integrity of the protective mesh. In some such embodiments, the sensor network includes one or more control circuits programmed (or otherwise configured) to monitor the various measurements captured from the sensor network to infer useful information on the integrity of the mesh itself. For example, the installed mesh may degrade over time due to adverse effects of soil, moisture, and ground movement. The sensor network detects (or more specifically, a control circuit is programmed or configured to detect) areas of mesh degradation and that would benefit from preventative or timely maintenance. The "control circuit"

can be incorporated into the embedded sensor network and/or realized using remote sensor data processors in communication with the embedded sensor network components such as a monitoring computing system. More specifically, as the protective mesh degrades it will be more susceptible to taking on water, become less rigid and may even rupture or warp. The signals from the fiber optic sensing network can be measured and monitored over time to detect any drift in the signals. This is expected to be a very slow change over time, however, once the signals reach a prescribed threshold set within the control circuit, the control circuit can generate a signal for maintenance.

In some embodiments, the sensor network comprising one or more fiber optic sensors can be embedded in the mesh along with 'geo-tags' and/or RFID chips into the polymer mesh and/or plates. Once installed, such geo-tagged sensors can be configured to provide precise location of the sensor and buried asset, thereby preventing unintended excavation or damage to the buried asset. Additionally, such configurations provide a reference point/location should maintenance be needed on the buried asset or the protective mesh itself.

In some embodiments, the sensor network comprising one or more fiber optic sensors can be configured to measure and/or relay information and data on cathodic protection of buried metallic pipelines and/or other metallic buried assets. The sensors can be realized using the fiber optic embedded in the mesh which are used to measure data on conditions such as soil resistivity and whether the buried pipeline is being adequately cathodically protected. Such a configuration can save on manpower and resources as data can be transferred via the fiber optic sensor network and made available to a monitoring system in real-time instead of requiring on-site interrogation of the asset.

In some embodiments, the sensor network comprising one or more of the exemplary fiber optic sensors described herein can be utilized to provide health and/or condition monitoring on the protected asset itself through detecting temperature, strain and acoustic/sound emission information, thus indicating when and where potential cracks and/or corrosion may occur or be taking place along the length of the buried asset. This can also be used to detect large discontinuities within the protective mesh structure. The use of the fiber optic sensors cam be ideal for safety and security considerations, for instance, any breach in a fiber can result in a loss of signal thereby providing direct warning and notification of the breach.

In some embodiments, the fiber optic sensor network, once installed along extensive pipeline networks can be used as a data conduit for other third-party entities which require extensive data transfer networks but lack funds and resources to lay optical networks. Accordingly, the system can be configured to include an interface to the network of optical fibers, including dedicated data fibers and/or optical fibers that comprise fiber-optic sensors, thereby allowing such entities to 'tap' into the deployed fiber optic network infrastructure.

In some such embodiments, the protective mesh can be delivered underground through a mechanized delivery system situated above ground and including spooled thermoplastic polymer mesh on reels. In one such embodiment, the spooled thermoplastic mesh is mechanically threaded below the subsurface from above ground. This creates an impact resistant barrier above the pipeline(s) to be protected. In some other such embodiments, polymer mesh having sufficient impact resistance is provided to protect a buried asset from subsurface impact damage. The polymer mesh can be provided, for example, when installing or otherwise accessing (e.g., trenching) the asset or underground region above the asset. The polymer mesh can be transported to the site on spools ready to be deployed as part of the subsurface impact protection system.

Once installed or otherwise deployed, the polymer mesh forms an efficient underground protective impact resistant barrier of buried structures, such as against accidental third-party damage (e.g., an excavator). Buried structures of any sort, such as pipelines, electric cabling, fiber optics, and the like, can be protected using the polymer mesh. In an example embodiment, the placement of the mesh is carried out through digging, trenching, and back filling.

In some embodiments, the sensor network is embedded through being pre-installed on the polymer mesh during manufacture. In some other embodiments, the sensor network is embedded into the polymer mesh on site. Similarly, in some embodiments, the sensor network is deployed along with mesh during mesh placement underground, as would be the case when the sensor network is not embedded. Similarly, in the case where a plate impact protection system is used, the fiber optic sensor network can be deployed along with polymer/composite protective plate during placement underground, as would be the case when the sensor network is not embedded.

The described techniques herein can be implemented using a combination of fiber optic sensors, transmitters, and other sensors and devices including computing or other logic circuits configured (e.g., programmed) to carry out their assigned tasks. These devices are located on or in (or otherwise in close proximity to) the protective mesh making up the subsurface impact protection system and associated sensor network. In some example embodiments, the control logic is implemented as computer code configured to be executed on a computing circuit (such as a microprocessor) to perform the control steps that are part of the technique. For ease of description, this processing logic (e.g., ASIC, FPGA, processor, custom circuit, or the like) will be referred to as a control circuit throughout. For further ease of description, this control circuit will be programmable by code to perform the control logic (or otherwise customize the circuit to perform its intended purpose).

FIG. 1 is diagram showing a top-plan view of an example fiber optic sensor network embedded in a polymer mesh structure of a subsurface impact protection system 100, according to an embodiment. The sensor network is an example of a fiber optic sensor network. Here, the protection system 100 includes a polymer (e.g., HDPE) mesh 110, which provides a useful platform as well as protection for the sensor network embedded within the mesh. For instance, in the exemplary configuration of FIG. 1, the mesh comprises a woven grid of polymer strands 115. At least a plurality of the polymer strands can include a fiber optic sensor 150 comprising a length of optical fiber 155 embedded therein, thereby forming the sensor network. Although not shown in FIG. 1, it should be understood that the optical sensors 150 can be completely encased in a respective polymer strand.

Optical fibers are, in general, transparent and made from glass or plastic. They are flexible (having a characteristic bend radius which determines the level of maximum flexibility). They are capable of transmitting light and large volumes of data/information over long distances. FIG. 2A is an exemplary cross-sectional diagram of an exemplary length of optical fiber. As shown, a single optical fiber 200 contains a core 205, which is the central part of the fiber where the majority of the light travels. The core is surrounded by a cladding 210 which has a different refractive index (optical impedance) that is selected to produce total internal reflection of the light, i.e. the light is reflected back into the core at the cladding core interface allowing the light to travel along the optical fiber. To protect the fiber, a plastic buffer coating 215 surrounds the cladding layer (e.g., to protect the fiber from breaking and moisture. Since the invention of optical fibers in the 1930's it has found numerous applications that range from data transfer and communications to illumination and inspection (endoscope to image in hard to reach areas) and in sensing.

The use of optical fibers as a sensing element is known for a large variety of sensor applications, such as, but not limited to: temperature sensors, pressure sensors, strain sensors, moisture sensors, gyroscope sensors, among others. Optical fiber sensors are preferably used in the subsurface impact protection system 100 due to their size, flexibility and because they do not require electrical power or conduct electricity and are immune to electromagnetic interference.

As a result of their characteristics (e.g., small size and flexibility), fiber optics are an ideal solution for embedding in plastic and composite materials of the impact protection system 100 where little to no negative effects are resultant on the reliability and strength of the optical fiber. There are two main types of fiber optic sensors, namely, intrinsic and extrinsic sensors. Extrinsic sensors take advantage of the fiber as the transmission channel between the point of measurements and the sensor. In other words, in extrinsic sensor configurations the measured change occurs outside the fiber and the fiber remains unchanged and is only the conduit of sensor information. For intrinsic sensors, the fiber is used as the sensing element. In other words, changes to the environmental parameter causes detectable changes to take place within the fiber. In the exemplary sensor network of the subsurface impact protection system 100, the fiber optic sensors are preferably of the intrinsic sensor type. However, in addition or alternatively, extrinsic sensors can be used.

FIG. 2B includes two high-level circuit diagrams illustrating exemplary configurations of an intrinsic sensor 250 (top) and an extrinsic sensor 270 (bottom). In the exemplary configuration of an intrinsic sensor 250, the sensor comprises an optical fiber sensing element 255 extending between an optical source 260 and optical detector 265. In the exemplary configuration of the extrinsic sensor 270, a sensing element 280 is connected between the optical source 260 and optical detector 265 by two segments of optical fibers 275A and 275B.

With the intrinsic sensor, several parameters of the light including intensity, time of flight, phase, polarization and wavelength can be measured to identify and quantify the various environmental parameters of interest. As discussed above, intrinsic sensors can be configured to measure various parameters including, pressure, stress, strain, humidity, temperature, vibration, gas/liquid presence, among others. Additionally, in some embodiments of the impact protection system 100, several sensors can be implemented along a single length of fiber and multiple fiber sensors can be multiplexed.

Figure 3:
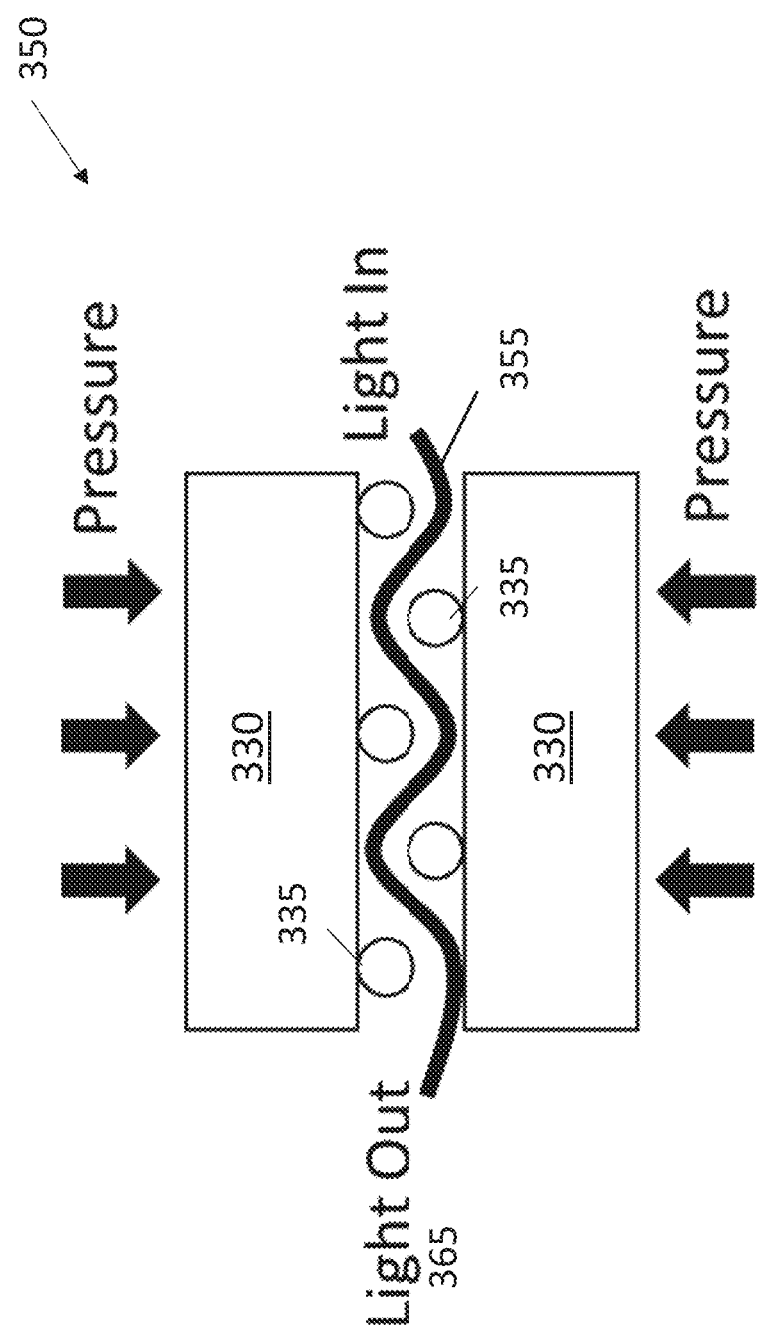
FIG. 3 is a side-view diagram illustrating an exemplary fiber optic sensor embedded in a polymer layer of a subsurface impact protection system, according to an embodiment.

FIG. 3 is a cross-sectional side view of an exemplary configuration of a fiber optic sensor 350 embedded within a polymer substrate 330 and that is useable to measure pressure based on light intensity. As shown the optical fiber 355 is arranged (e.g., weaved) between protrusions 355 from upper and lower layers of the polymer substrate 330 to take advantage of the minimum bend radius of the optical fiber 355 to produce a loss in optical intensity, which can be measured at an optical detector (not shown) provided at the output 365. When the fiber 355 is bent beyond the minimum bend radius, light escapes the fiber's core and cladding (not shown) and is no longer transmitted along the fiber. As the bend radius (i.e. the amount the fiber is bent by) increases, more light is lost. In this case the bend radius can be directly correlated to the loss in intensity of light which can be directly correlated to the pressure applied to the optical fiber 255.

By way of further example, in some embodiments, the sensor network of the impact protection system 100 can comprise a fiber optic sensor of the type that is that operates based on periodic changes in the refractive index. For instance, FIG. 4 (top) is a schematic diagram that provides a cross-sectional side view of an exemplary fiber optic sensor 450 including a Fiber Bragg Grating 435. Fiber Bragg Gratings (FBG) are also commonly used as intrinsic optical fiber sensors and can be used to detect a number of relevant parameters. An FBG can be used for stress, strain, pressure, vibration, leak detection, among other parameters. The grating 435 is provided in the core 405 of the fiber and is designed, using periodic refractive index changes distributed along the fiber, to transmit a range of light wavelengths and reflect others. FIG. 4 (bottom) includes three graphs representing the input signal characteristics and the resulting transmitted signal and reflected signal characteristics as a function the configuration of the FBG. The reflected wavelengths in this exemplary configuration shown in FIG. 4 are known as the Bragg Wavelengths $\lambda_B$ where:

$$\lambda_B = 2n_e \Lambda$$

Here $n_e$ is the effective refractive index of the grating and $\Lambda$ is the grating period. It can be seen here how changes in any of the parameters will affect the reflected wavelength i.e. stretching of the fiber from stress will change the period, compression from strain will also have a similar effect. Changes in the temperature will also lead to spatial variations in the grating 435. In some embodiments, several Bragg gratings can be installed along a fiber where the reflected wavelength can be tuned to different wavelengths. This can allow localization of the areas where salient stress, temperature or other measured parameters are present. For example, in the case of a humidity sensor (i.e. moisture sensor) the section of fiber containing the grating can be coated with a material configured to change structurally with changes in humidity. Accordingly, the changes in the coating will force the grating to change providing a measurement for the moisture. Similar techniques have been used to enhance the sensitivity and measure other properties.

Returning now to FIG. 1, the sensor network can comprise numerous optical fibers 155 each having one or more sensor nodes. Fiber optic sensors require optical inputs to operate. As such, each fiber 150 requires an optical input from an optical source 160 to work as intended. In addition, although not shown, data lines can electronically transmit the output signal as measured by one or more optical detectors to a control circuit (not shown) or monitoring computing device 190 that performs sensor monitoring operations.

For ease of illustration and description, the polymer strands 110 forming the mesh are illustrated in this and other drawings herein as a grid pattern. However, that is but one example implementation, and other embodiments are not necessarily limited to that arrangement or polymer material. For example, in some other embodiments, the polymer strands and fibers are arranged in a different pattern (such as squares or triangles), as would be apparent in light of the present disclosure. In some embodiments, the polymer mesh is composed of a woven pattern of HDPE (and possibly other polymer) strands.

Additionally, while the fiber optic sensors 150 are embedded within the polymer strands, in addition or alternatively, the fiber optic sensors can be provided separately and interwoven with the polymer strands. Likewise, for some plate-type implementations of the protection system, the fiber optic sensors can be embedded in the polymer plates.

The protection system 100 in FIG. 1 includes intrinsic fiber optic sensor configurations such as those shown and described in connection with FIGS. 2-3. Each of the optical fibers 155 receives an optical signal from an optical source 160 at an input end of the fiber and transmits that optical signal along its length. The length of the optical fiber of a given sensor can vary. In further detail, one or more optical detectors 165 are optically coupled to an output end of the fibers respectively and measure properties of the respective output optical signals. Such information can be relayed by the optical detector to a receiving node, monitoring station, or other control circuit for further processing or retransmission.

The fiber optic sensors 150 are distributed appropriately (e.g., sparsely, densely) throughout the mesh to provide sufficient coverage for their intended purpose, balancing factors such as cost, redundancy, wiring complexity, and the like. Additionally, to the extent a given length of optical fiber 155 includes multiple sensor elements, those sensor elements can be distributed appropriately for their intended purpose.

The fiber optic sensors 150 receive protection from the polymer mesh fibers 110 by being embedded in the fibers or, in addition or alternatively, by being inter woven with the fibers. In a similar manner, the input optical data line 192 and output data line 194 can be protected by the polymer mesh 110 by being part of or attached to the polymer strands 110 making up the mesh. Likewise, for a polymer plate implementation, the fiber optic sensors and data lines can be embedded in, or at least partially embedded in (such as part of or closely attached to), the polymer plates and receive protection from the polymer plates.

The fiber optic sensors can be configured to output optical signals representative of changes in the corresponding environmental conditions (such as pressure, temperature, humidity, and the like). The output optical signals are received by optical detectors 165 configured to measure one or more parameters of the light including intensity, time of flight, phase, polarization and wavelength. These measurements can be transmitted along data lines 194 for eventual acquiring by an external monitoring computer 190, local processor or circuit configured (e.g., by code or logic) to process the data into useful information for later purposes (e.g., displaying, alerting, tracking, diagnosing).

There are a variety of ways of deploying or embedding the sensor network in the subsurface impact protection system. In some embodiments, the sensor network is pre-installed on spooled polymer mesh used to build the protection system. In some such embodiments, the sensors or sensor connection circuitry (or both) along with the optical input/output and data connections are installed in the polymer mesh during spooling of the polymer mesh material. In some such embodiments, the sensors and sensor connection circuitry are fixed in place using adhesive, such as an epoxy-based adhesive. In some such embodiments, any connection wires or fibers (if present) are also spooled with the polymer mesh. As such, when deploying the spooled polymer mesh material at the appropriate point above the assets to be protected, the corresponding sensor network is also deployed. Final connections, such as to above-ground signal supply or sensor data receiving stations, can be performed after the spooled polymer mesh deployment.

In some other embodiments, the installation of the embedded sensor network takes place during the polymer mesh placement: This can be a more manual approach of installing the sensor network. For instance, in some such embodiments, an operator weaves or guides the placement of sensor network fibers and wires (e.g., for data transmission to the surface) as well other devices or sensors into the polymer mesh as the polymer mesh is inserted or otherwise installed underground. Additionally, for a protective plate, the sensor network can be embedded in the plate during manufacture or adhered to the plate after manufacture and before placement in the ground.

Figure 5:
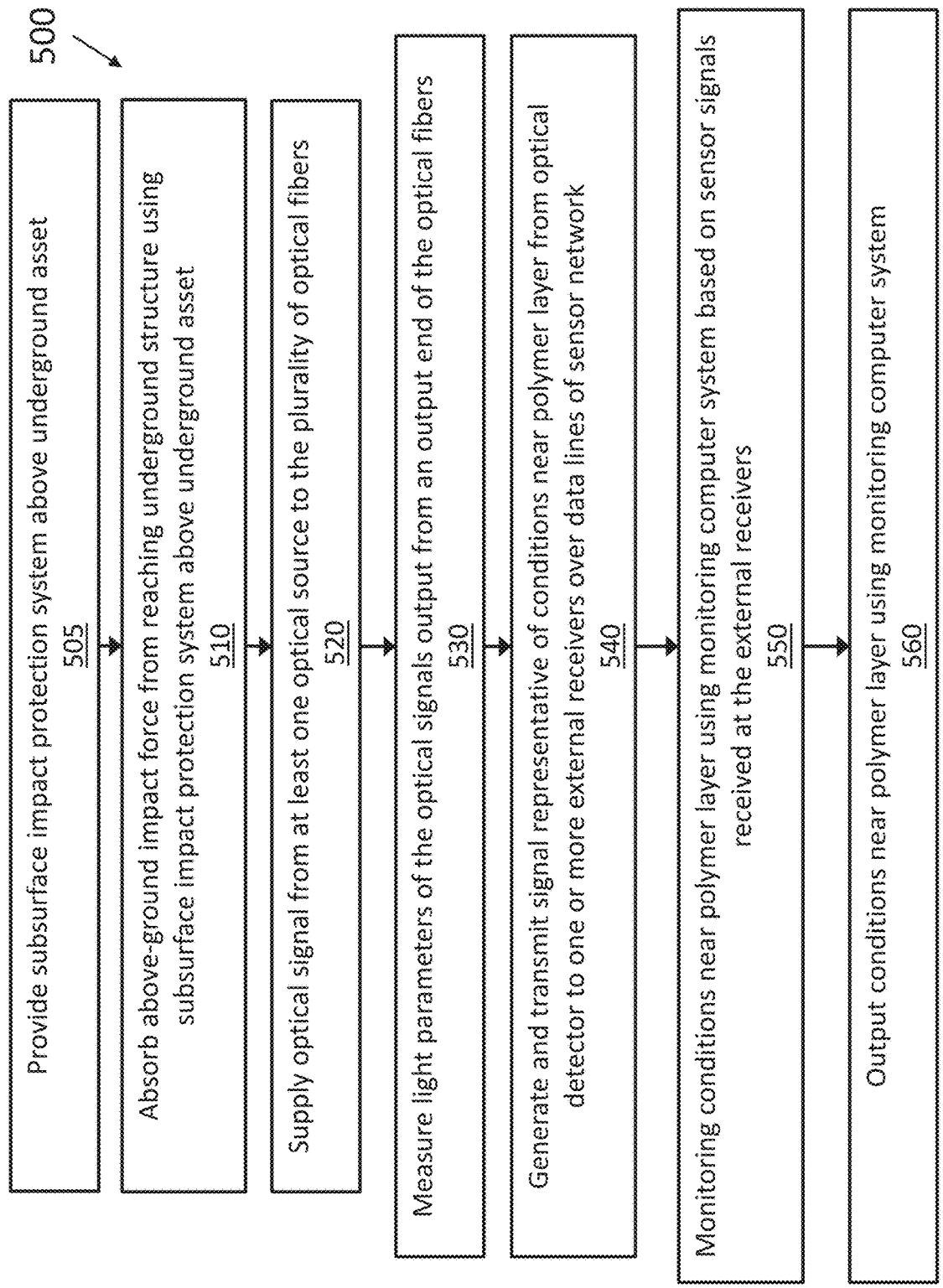
FIG. 5 is a flow diagram of an example method of impact protection of an underground structure using a sensor network that is embedded in a polymer layer of a subsurface impact protection system, according to an embodiment.

FIG. 5 is a flow diagram of an example method 500 of impact protection of an underground asset (such as a pipeline or storage vessel) using a sensor network. The sensor network is embedded in (e.g., part of, close to, or attached to) a polymer layer (such as HDPE mesh 110). The sensor network and polymer layer are part of a subsurface impact protection system (such as subsurface impact protection system 100), according to an embodiment.

Some or all of the method 500 can be performed using components and techniques illustrated in FIGS. 1 through 4. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 500 (or other disclosed method) to be carried out. It should be noted that in other embodiments, the order of the operations can be varied, and that some of the operations can be omitted. Some or all of the method 500 can also be performed using logic, circuits, or processors located on or in electrical communication with a subsurface impact protection system configured to carry out the method 500.

The method 500 begins at step 505 in which the subsurface polymer impact protection system 100 is provided below the ground surface and above the underground asset requiring protection. The polymer layer comprises one or more of a polymer mesh or plate structure. A fiber optic network is embedded in the polymer layer and includes a plurality of optical fibers that each include one or more fiber optic sensors (such as optical fibers 155 configured to provide one or more intrinsic fiber optic sensors 150, 250, or 350 and the like). For example, in one embodiment, the sensors are configured to measure one or more different conditions or parameters such as but not limited to, strain, pressure, temperature, rotation, acceleration, pH, humidity and corrosion or the like for the environment near the impact protection system including the underground asset.

At step 510, above-ground impact force is absorbed using the polymer layer and thereby prevented from reaching the underground asset. The method 500 further includes steps directed to monitoring the environment near the impact protection system including the underground asset using the sensor network.

More specifically, with respect to monitoring operations, the method 500 further includes, at step 520, supplying an optical signal from at least one optical source (such as optical source 160) to the input end of each of the optical fibers via one or more optical input lines (such as optical input lines 162) of the sensor network. The one or more optical sources and the signals they provide can be controlled by a computing system in communication with the source(s) over a data input line (such as the monitoring computing system 190 which communicates with the optical sources over an input data line 192).

The method 500 further includes, at step 530, detecting the optical signals output by the optical fibers, respectively, and measuring one or more light parameters from the detected output signals. In particular, the light parameters can be measured using one or more optical detectors that are optically coupled to the output end of the optical fibers (such as the optical detectors 165 coupled to optical fibers 155 via respective optical output lines 166).

The method 500 further includes, at step 540, generating, by the optical detector, a sensor data signal. The sensor data signal can include the measured values of one or more light parameters detected by the optical detector. Such information can, in turn, enable an internal or external control circuitry or monitoring system to calculate values for the environmental parameters of interest. Additionally, in some embodiments, the optical detector and associated processing circuitry can be configured to generate a sensor data signal that includes the values for one or more environmental parameters calculated as a function of the one or more measured light parameters.

In addition, the method 500 includes, at step 540, transmitting the generated sensor signals from the one or more optical detectors to one or more external receivers (e.g., monitoring computer 190, relay points) via one or more data communication lines (such as data line 194) of the sensor network. For example, the steps 540 and 550 can be done using a control circuit (e.g., programmable processor or logic circuit) in communication with the one or more optical detectors and programmed to carry out the corresponding steps.

In some embodiments, the sensor network further includes a corresponding plurality of wireless transmitters connected to the plurality of optical detectors such that communication with the monitoring system 190 occurs over a data line 194 that is a wireless data communications connection. In such an embodiment, the step of transmitting 550 the generated sensor signals includes delivering the generated sensor signals from the sensors to the wireless transmitters using the data lines, and wirelessly transmitting the delivered sensor signals to the one or more external receivers using the wireless transmitters.

In addition, the method 500 includes, at step 550, monitoring conditions near the polymer layer using a monitoring computer system (such as monitoring computer 19) as a function of the sensor signals received at the external receivers. As noted this can include quantifying the environmental parameters of interest based on the received sensor signals. In addition, the monitoring step can include comparing the measured parameters to one or more parameter set points to determine whether any parameters are out of specification.

In addition, the method 500 includes, at step 560, outputting the result of the monitoring step. This can include generating and outputting, using the monitoring computer system and associated visual and audio output devices and communication interfaces, alerts in the event out-of-specification parameters are detected based on the sensor data. Step 560 can also include outputting the measured values of the parameters for real time viewing on a visual display and storing such information as necessary in a database or memory.

Additionally, the monitoring system can be further configured to determine and output a location of the breach based on the particular fiber optic sensor that is triggered and a known location of that sensor.

In some embodiments, the disclosed systems and methods for subsurface impact protection including fiber-optic sensor network is configured to make use of the optical fiber to facilitate data transfer in parallel to it being a sensory system. This can be especially useful when relaying information from other sensors. Other areas for data transfer are in communication, this is especially important when considering long lengths of pipeline.

In some embodiments, the monitoring computing system 190 can be configured to monitor traffic over the pipe. For instance, based on the vibrational measurements and stress and strain measurements of a given fiber optic sensor among the sensors, the monitoring system can monitor the traffic over the asset. Additionally, the monitoring system can be configured to evaluate the strength of the signal from the one or more fiber optic sensors to identify the type of traffic, e.g., people, light vehicles, heavy vehicles and so on. Knowledge of the traffic can provide inspection engineers with an additional data point when planning maintenance schedules as protected pipes with heavier and more frequent traffic would require more inspection.

In some embodiments, the monitoring computing system 190 is configured to ensure security and safety of the underground asset in terms of excavation. This is one of the principal reasons behind the subsurface impact protection system. Many times, damages occur to underground assets during excavation as the location of the asset is unknown. Accordingly, the objective of the protective mesh or plate is to limit any damage from digging, however, according to a salient aspect, the stress and strain and vibrational measurements from the sensor network are usable to provide early warning that a digger is close to a particular location of a pipe.

In some embodiments, the monitoring computing system 190 is configured to, based on fiber optic sensor measurements, detect events in which an asset such as a pipe is leaking. The sensory system can also be used to detect any other pollutants that enter the soil. This can be important when considering environmental condition of the soil but also in determining any pollutants that might have an adverse effect on the asset or protective mesh system itself (e.g., increase rate of corrosion of the asset and/or degrade the protective mesh). Accordingly, the monitoring computing system 190 can be configured to use sensor measurements to monitor water entering the soil (e.g., rainwater, water with acidic components), which can be important when concerned with corrosion of metallic assets.

Figure 6:
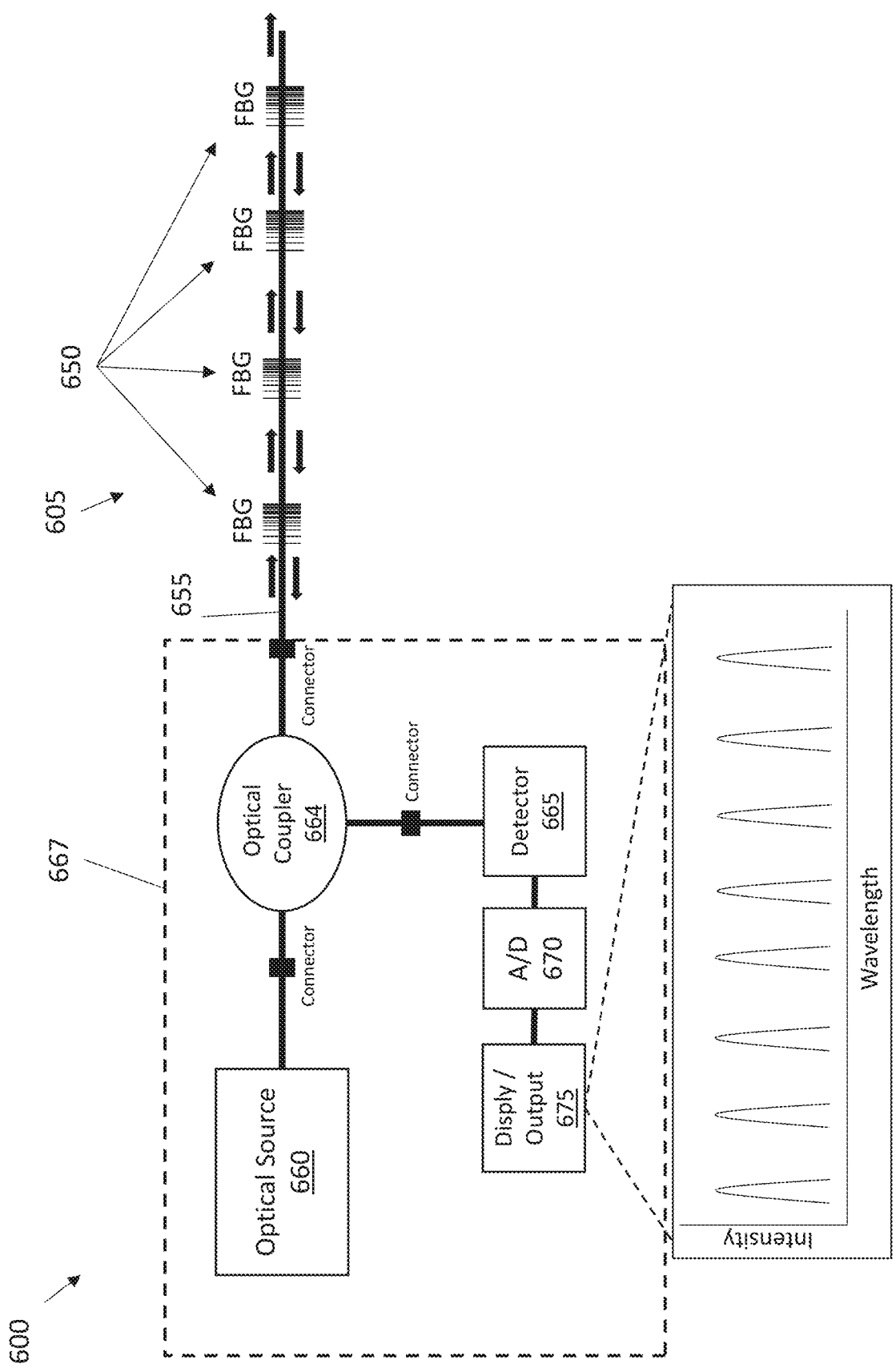
FIG. 6 is a top view schematic diagram of an exemplary fiber optic sensor network that is usable in a subsurface impact protection system according to an embodiment.

FIG. 6 is a schematic diagram of an exemplary fiber optic sensor network 605 that is usable in a subsurface impact protection system according to an embodiment. The sensor network 605 includes a plurality of FBG sensors 650 arranged along a single optical fiber 655. It should be understood that the exemplary system shown in FIG. 6 is similarly usable with as little as one FBG sensor. As long as the Bragg Gratings are set with different wavelengths any number can be placed on a single fiber. However, anything beyond 100 can be impractical since each FBG is configured to reflect a different wavelength to enable distinguishing between FBGs based on wavelength.

The sensor network is coupled to an optical source 660, which operates in the range of 1500 nm to 1600 nm. A source operating in the range of 1500-1600 nm can be preferable because this range is commonly used in optical communications, reducing development costs and increased availability of 'off the shelf' sensors and other components (e.g., high bend radius fibers, optical couples, connectors, and the like). However, it should be understood that this exemplary configuration does not limit the use of other wavelengths or broadband sources in accordance with one or more disclosed embodiments.

The distance between the sensors 650 along the length of the fiber can be on the order of one or more millimeters to about one km, and the distance depends on the resolution required. In this particular example and depending on the type of asset being monitored tens of centimeters to one to two meters of separation between sensors can be sufficient.

The maximum distance of a fiber line can be several kilometers—however such lengthy fibers are typically not necessary for the protection of underground assets using the systems and methods disclosed herein.

As shown in FIG. 6, the source 660 can be connected to an optical couple 664. For example and without limitation, couple 664 can be a 3 dB coupler or more preferably an optical circulator that allows light to travel in both directions unattenuated and without re-entering the source. In operation of the network 605, the light travels from the source through the coupler to the network of FBG sensors 650 provided along the fiber 655. Within the sensor network, as shown by the directional arrows, the light travels away from the source along the fiber and the Bragg wavelength is respectively reflected by the FBGs back to the coupler and then to the detector 665. Also shown in communication with the detector 665 is an A/D converter 670 and display/output 675 for outputting the received signal.

There are many well-known detection techniques, but the most commonly used is an optical spectrum analyzer (OSA) which can be configured to directly measure the wavelength, determine a respective position of the FBGs (e.g., based on the change in wavelength) and intensity, and then provides an electrical signal output that is directly related to the measurements. This analog signal can be converted to a digital signal (e.g., by an A/D converter 670) for further use, for example, calculations of parameter comparisons, triggering alarms, presenting a visual display and the like. Other detection solutions can be implemented, for example, interferometry, which is highly accurate, or a simple optical detector configured to measure intensity changes. It should be understood that intensity changes could also be seen with the OSA, which can record the spectral components of the received signals and the height(s) (i.e., intensity). For example, FIG. 6 includes an exemplary graphical representation of the measured wavelength and intensity of spectral components detected by the detector and output by a display 675.

It should also be noted that, in some embodiments, additional components such as optical filters can be provided before the detector to provide a cleaner signal with less noise or incorporated into the detector solutions. For instance, OSAs typically have filters incorporated in the instrument.

In one exemplary application of the sensor network 605, the fiber can be extended along the length of a buried asset, alone or in a polymer fiber, mesh or plate, to capture information on various measurable parameters of interest.

Figure 7:
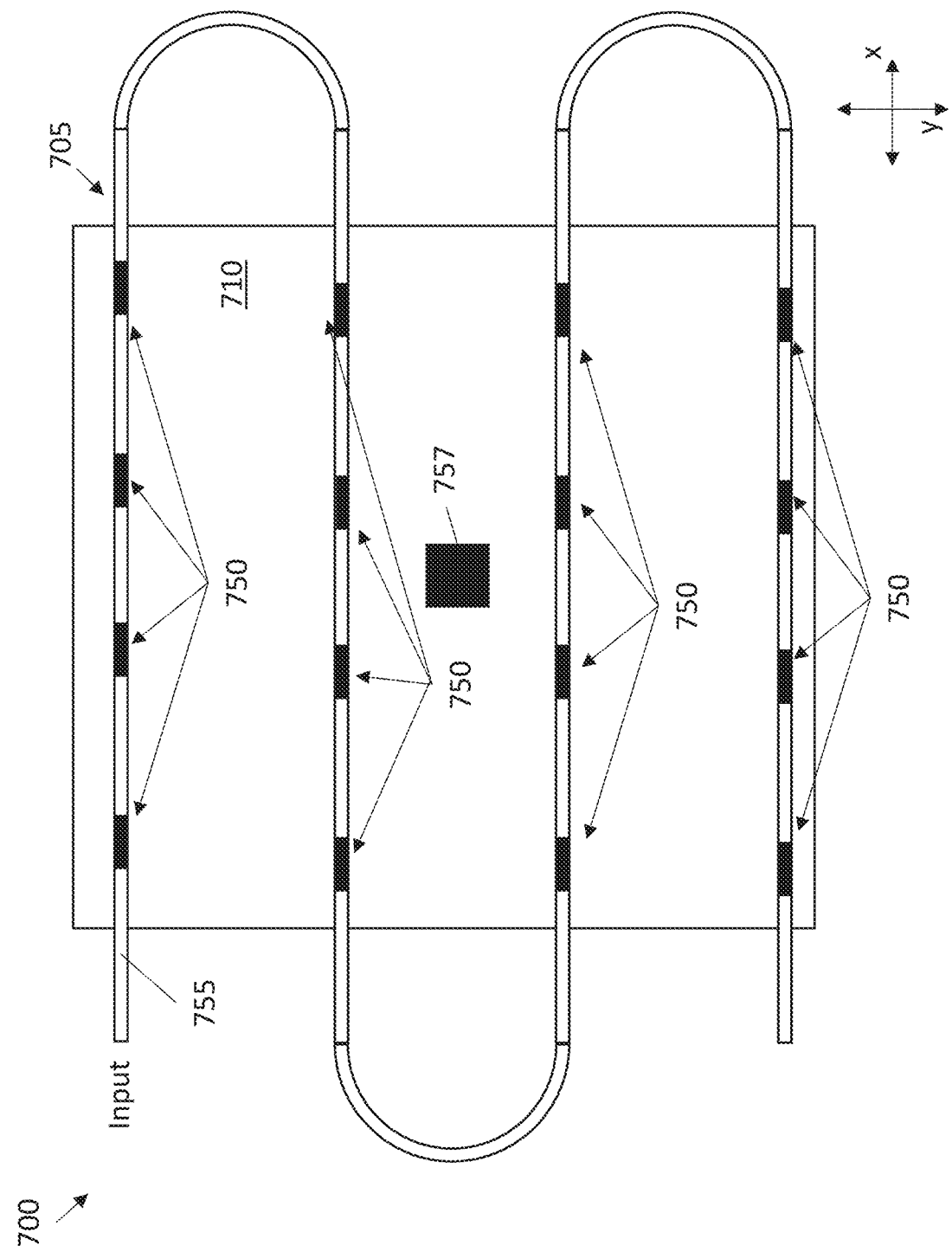
FIG. 7 is a top view diagram of an impact protection system according to an embodiment.

FIG. 7 is a schematic diagram of a subsurface impact protection system 700 including a sensor network 705 distributed over a polymer mesh 710 according to an embodiment. The configuration shown in FIG. 7 is a single layer mesh solution with a single source. The polymer mesh 710 is shown in a simplified form to more clearly illustrate the exemplary arrangement of the sensor network within the mesh. In some embodiments, the exemplary source and detector solution 667 shown and described in connection with FIG. 6 can be coupled to an input end of the fiber sensor network to both feed and measure the reflected optical signals from the input end. In addition or alternatively, a detector can be provided at the opposite end of the fiber from the source so as to measure the signal parameters at the far end of the fiber.

In the exemplary configuration of system 700, a linear length of optical fiber 755, which includes a plurality of fiber optic sensors 750 spaced apart linearly, is extended back and forth across the mesh 710. The length of optical fiber can be provided in one segment or multiple segments connected in series.

The distance between the sensors in the x direction (e.g., along the length of the optical fiber) can be in the tens of centimeters range for this application, but again this can vary depending on the sensor resolution needed. The distance between the sensors in the y-direction can have similar spacing, although the adjacent lengths of fiber can be arranged with greater or lesser spacing as needed. As shown in FIG. 7, the fiber optic sensors 750 can be located within the area of the mesh 710, rather than being located along portions of the fiber 755 that might extend away from edges of the mesh (e.g., the 180 degree bends connecting adjacent linear lengths of fiber).

Also shown in FIG. 7 is an exemplary geo-tagging sensor 757 that, as noted above, can be wirelessly read to identify and locate the sensor network and mesh. In some embodiments, the geotagging sensor can be placed in the center of a given section of mesh. The ability to detect the location of the center of the plate combined with known dimensions of the plate can allow for an accurate excavation to occur if needed.

Figure 8:
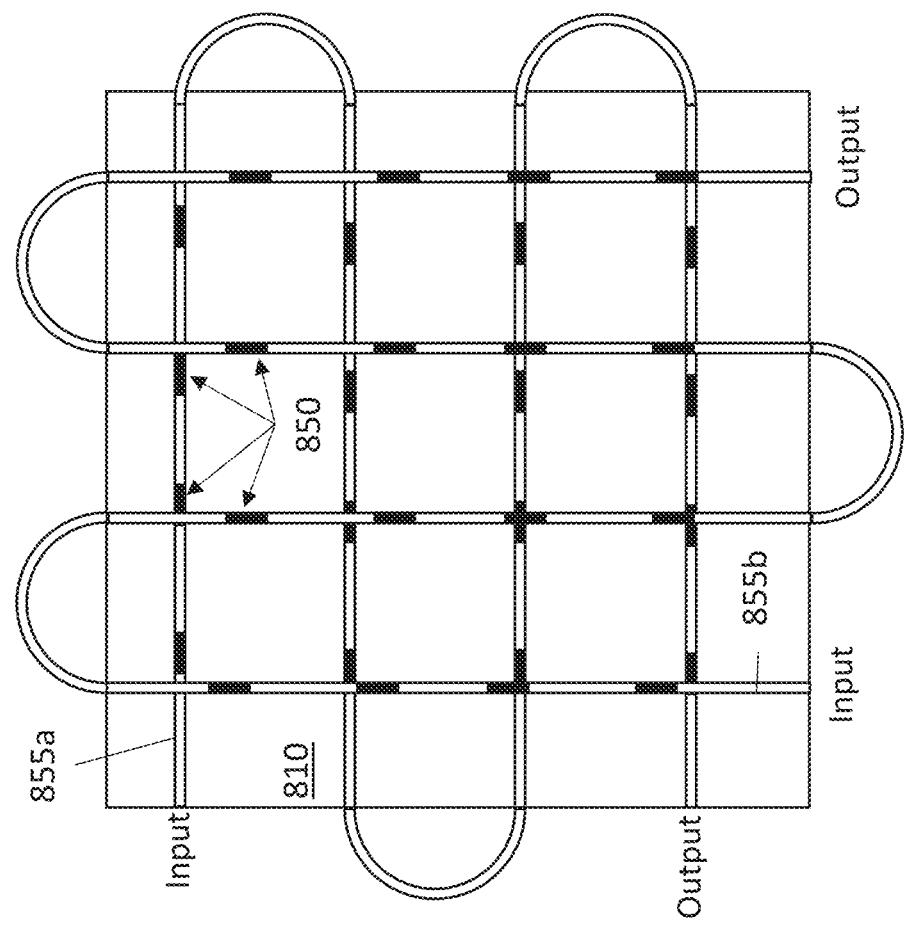
FIG. 8 is a top view diagram of an impact protection system according to an embodiment.

FIG. 8 is a top-view diagram of an orthogonal mesh and sensor network design according to an embodiment. As shown, linear lengths of the optical fiber 855 including the fiber optic sensors 850 are orthogonally arranged over a polymer mesh 810. The mesh 810 is shown in a simplified form with the fiber network appearing on top of the mesh rather than embedded therein. This exemplary orthogonal sensor network configuration can provide more accuracy for stress and strain measurements. As shown in FIG. 8, two linear lengths of fiber are used, 855*a* and 855*b*, and each having an input end that can be coupled to a source (not shown) and an opposite output end that can be coupled to a detector (not shown). However, in addition or alternatively, a source and detector can be provided at one end of a respective length of fiber, similar to the configuration shown in FIGS. 6 and 7. Furthermore, a single source, such as source/detector system 667, could be used with the orthogonal network design, provided the signal from the source (e.g., source 660) is split into two signals, one for each fiber, and each fiber's output is connected to the coupler (e.g., coupler 664) which is further connected to the detector (e.g., detector 665).

Similar to the exemplary configuration shown in FIG. 7, the distance between the sensors in the x direction (e.g., along the length of the optical fiber) and/or y direction can be in the tens of centimeters range, but this can vary depending on the sensor resolution needed. Additionally, the fiber optic sensors 850 are located within the area of the mesh 810, rather than being located along portions of the fiber 855 extending away from edges of the mesh.

Figure 9:
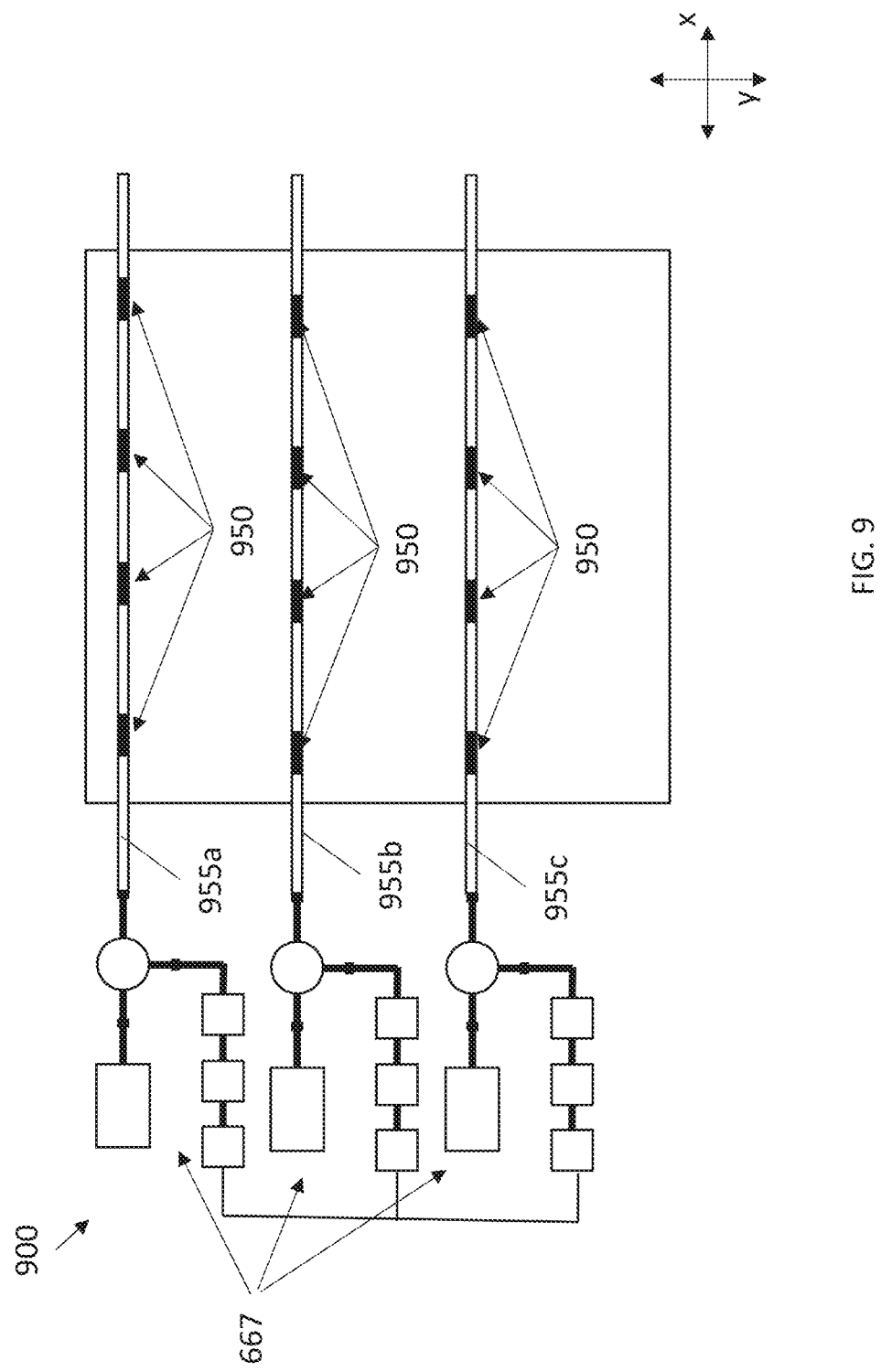
FIG. 9 is a top view diagram of an impact protection system according to an embodiment.

It should be understood that the configurations presented above can be modified for use with multiple input sources. For example, FIG. 9 is a top view diagram of an impact protection system 900 according to an embodiment. The system 900 comprises a polymer mesh 910 and, disposed therein, three linear lengths of fibers 955a, 955b and 955c, which each include fiber optic sensors 950. As shown, each fiber is coupled at a respective input end to a respective source and detector system 667. It should be understood that the orthogonal mesh network design of FIG. 8 can similarly be adapted such that one or more lengths of fiber are respectively coupled to a source at an input end and a detector at one or more of the input end or an opposite output end.

Figure 10:
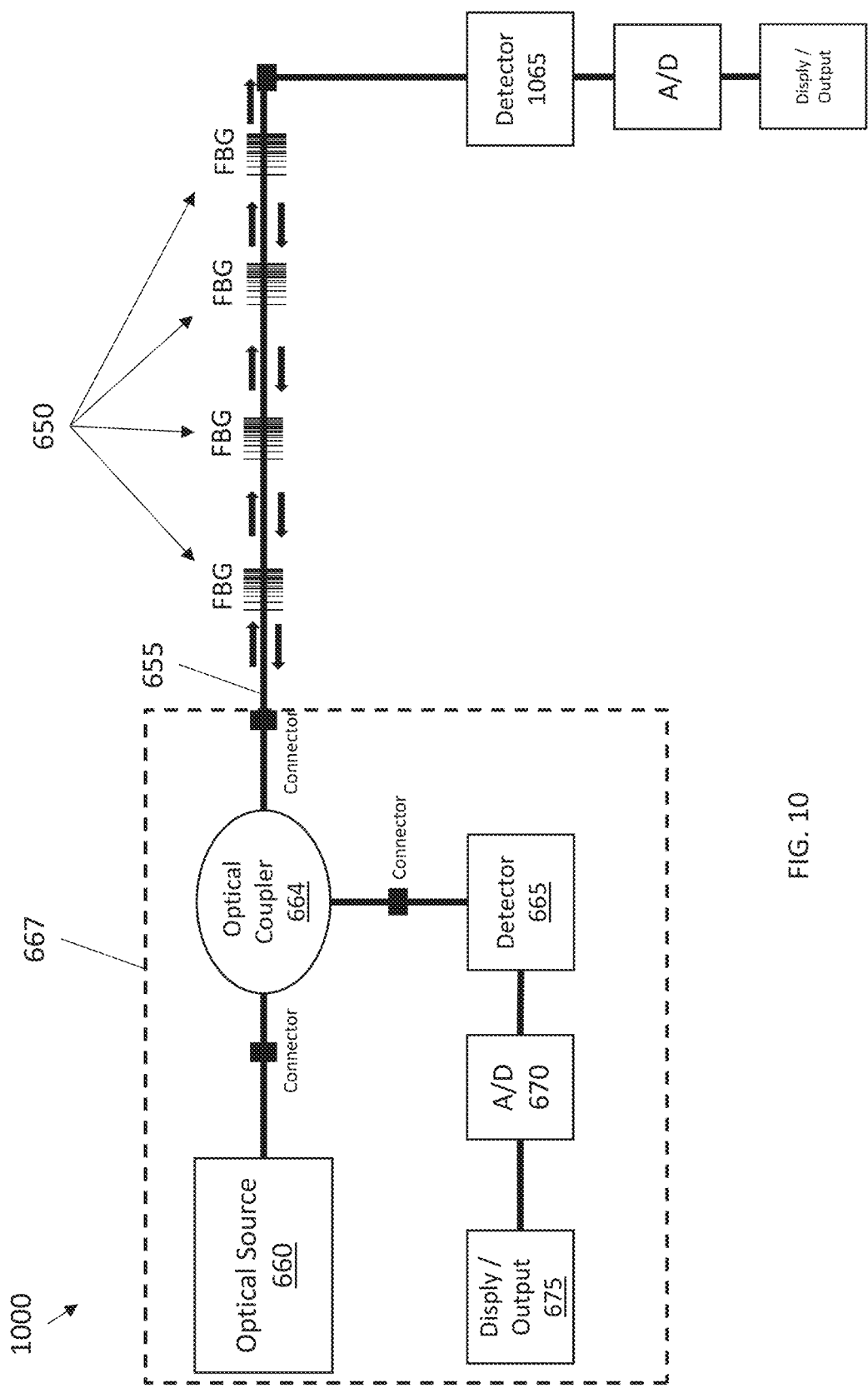
FIG. 10 is a schematic diagram of an exemplary fiber optic sensor network in accordance with an embodiment.

FIG. 10 is a schematic diagram of an exemplary fiber optic sensor network in accordance with an embodiment. The sensor network of FIG. 10 is based on the sensor network shown and described in connection with FIG. 6 except that it is modified to also include a detector 1065 coupled to the end of the fiber 655 that is opposite the input end coupled to the source 660 and detector 665. In such a configuration, the detector 1065 can be configured to measure the signal at the output end in order to analyze the received light spectrum without the reflected signal.

Figure 11:
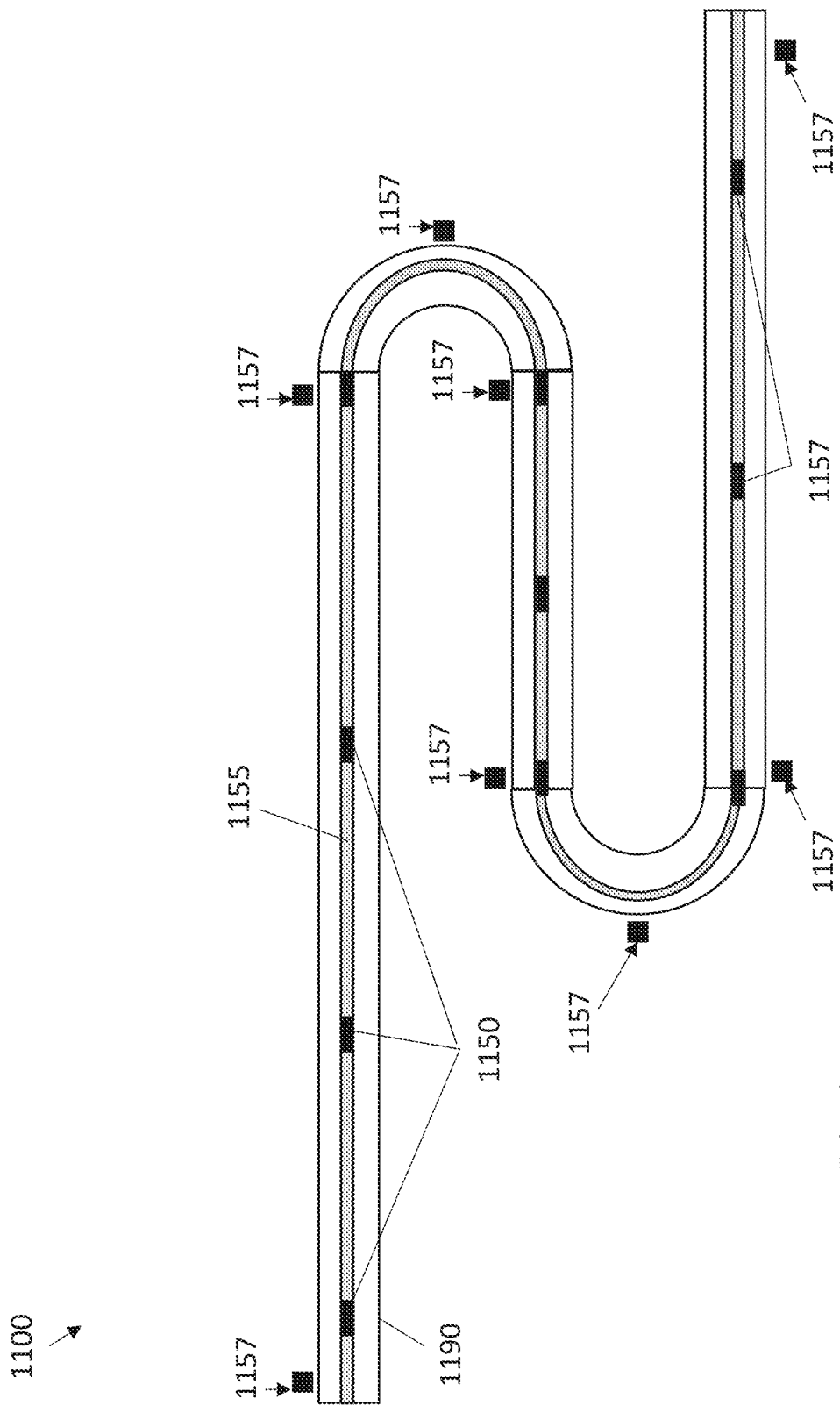
FIG. 11 is a top view diagram of an exemplary impact protection system comprising a sensor network and geo-tagging sensors provided along the length of an asset according to an embodiment.

FIG. 11 is a top view of an exemplary subsurface impact protection system 1100 in accordance with an embodiment. The system 1100 includes a sensor network 1105 comprising a long length of fiber 1155 and a plurality of fiber optic sensors 1150 extended linearly along an asset 1190. In some embodiments, geo-tags 1157 can be placed along the length of the fiber 1155, at bends and along strait lengths of the fiber. The location information obtained from such sensors can facilitate accurate mapping of the asset underground.

While the exemplary subsurface impact protection systems shown and described in connection with FIGS. 6-11 can preferably comprise intrinsic fiber optic sensors. Intrinsic sensor network configurations can be preferable as they do not typically require any external parts or additions to the fiber network and have relatively high levels of accuracy depending on the signal conditioning and resolution of the optical detection setup.

However, in one or more embodiments, a subsurface impact protection systems having a similar sensor network topology can be realized using optical fibers and extrinsic sensors.

Extrinsic sensors generally are configured to use a change in intensity to measure or calibrate the required parameter (e.g., pressure, temperature and the like). Another parameter that can be analyzed to measure the required parameter is polarization of the light, although less common. To locate the area of concern, the reflected signal and time of flight can be measured. Any change in refractive index causes a reflection where the strength of the reflected signal is dependent on the change in refractive index thus severity of the measurand.

Figure 12:
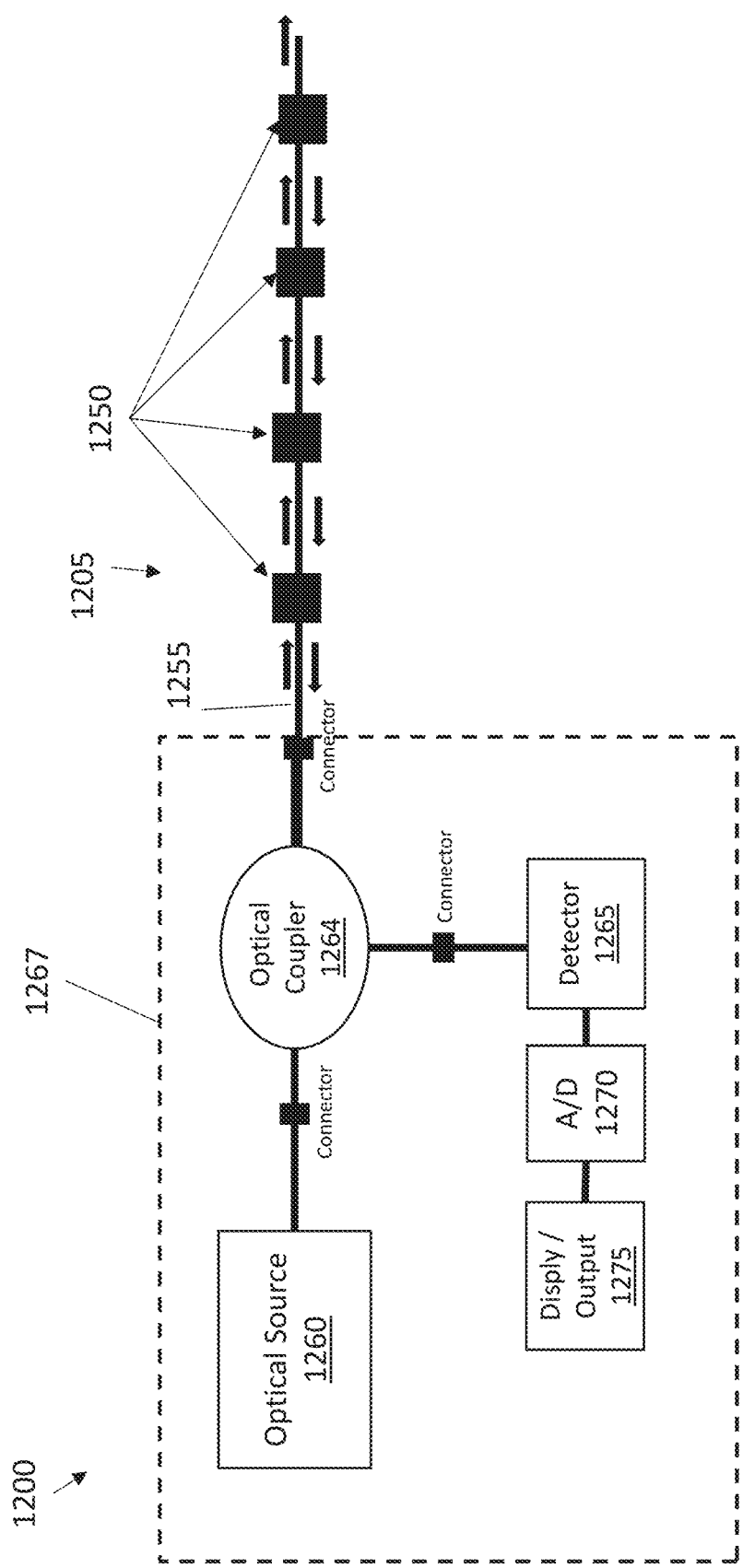
FIG. 12 is a top view of an exemplary impact protection system comprising an extrinsic sensor network according to an embodiment.

FIG. 12 is a top view of an exemplary impact protection system 1200 comprising a sensor network 1205 having a similar layout as the exemplary network 605 shown in FIG. 6. System 1200, however, includes a plurality of extrinsic sensors 1250 linearly arranged and connected by an optical fiber 1255. The exemplary source and detection scheme 1267 can be similar to the source/detector system 667 of FIG. 6, however, in this particular extrinsic sensor network configuration, the detector 1265 is configured to monitor the intensity of the return signal transported by the fiber 1255. This can be done using an OSA configured to measure the intensity of the reflected signal's wavelength peak. An alternative configuration for the detector, which can be straightforward and cost-effective, could include a photodiode that converts the optical intensity to electrical intensity directly. The optical source 1260 in this embodiment can be configured to send a timed train of pulses or burst of pulses. Additionally, the time of flight between pulses sent by the source 1260, which is predefined, and those received at the detector 1265, which can be measured using the detector, can further be utilized to calculate the position of any disturbance represented by the detected signals.

By way of further example, if the system 1267 is configured for a polarization measurement, the input of the detector 1265 can be configured to include polarizers (not shown) such that the intensity of the output of these polarizers can be used to determine the location and severity of a fault from the signals.

However, in one or more embodiments, a subsurface impact protection systems having a similar sensor network topology can be realized using optical fibers and extrinsic sensors.

Figure 13:
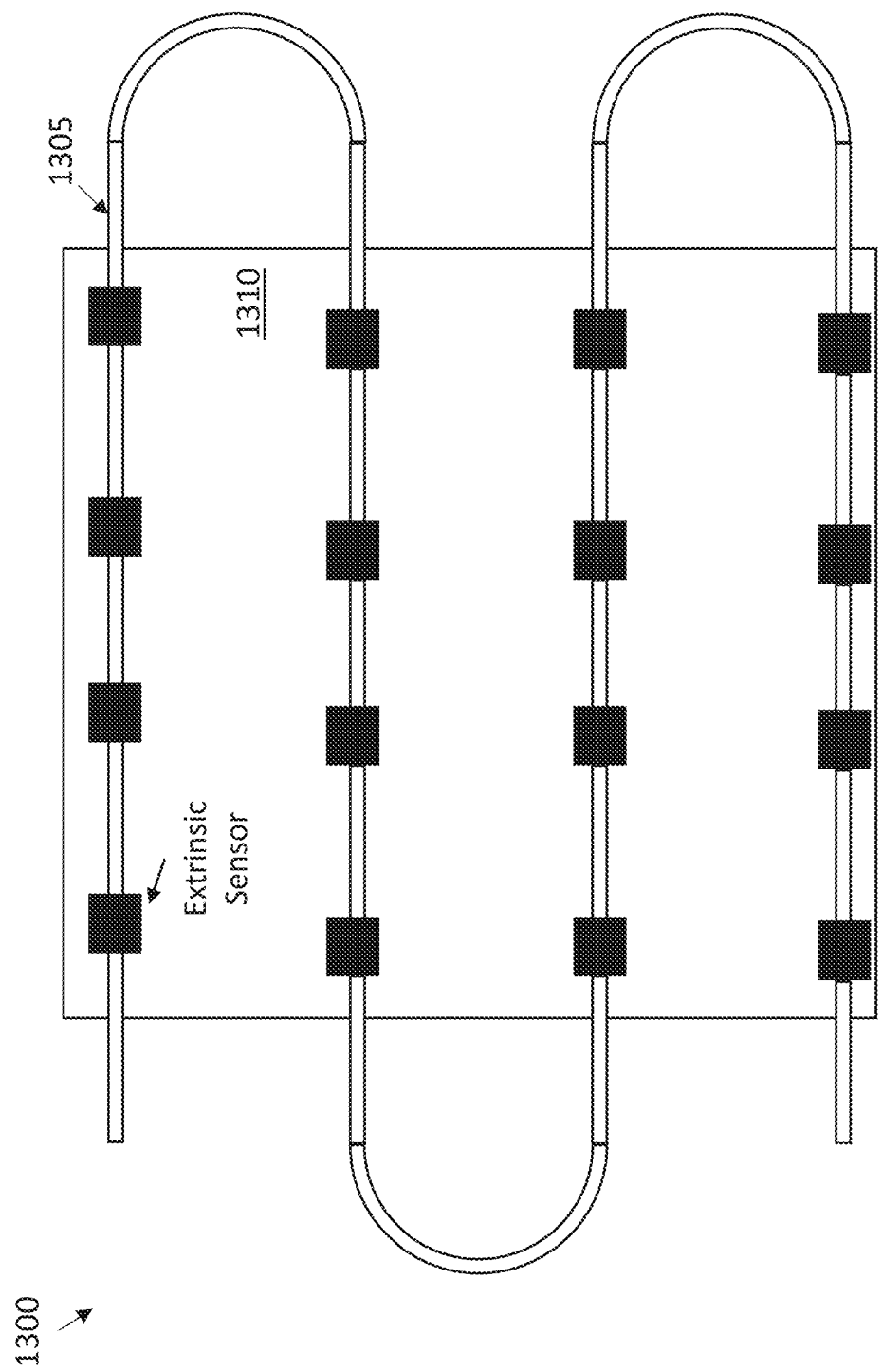
FIG. 13 is a top-view diagram of a subsurface impact protection system and sensor network including extrinsic sensors according to an embodiment.

According to an embodiment, FIG. 13 is a schematic diagram of a subsurface impact protection system 1300 including a sensor network 1305 comprising extrinsic sensors connected by optical fibers distributed over a polymer mesh 1310 having a similar layout as the intrinsic sensor-based system 700 shown in FIG. 7.

According to an embodiment, FIG. 13 is a schematic diagram of a subsurface impact protection system 1300 including a sensor network 1305 comprising extrinsic sensors connected by optical fibers distributed over a polymer mesh 1310 having a similar layout as the intrinsic sensor-based system 800 shown in FIG. 8.

According to an embodiment, FIG. 14 is a top-view diagram of an orthogonal sensor network 1405 design comprising extrinsic sensors spaced apart along or connected by optical fibers and having a similar layout as the intrinsic sensor-based network shown in FIG. 8.

According to an embodiment, FIG. 15 is a top-view diagram of a sensor network design comprising extrinsic sensors arranged along separate linear lengths of optical fibers and having a similar layout and configuration as the intrinsic sensor-based network shown in FIG. 9.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A subsurface impact protection system for protecting an underground asset, the protection system comprising:
    an elongate planar subsurface polymer layer buried above the underground asset, wherein the polymer layer comprises a protective mesh including a plurality of polymer strands in a woven pattern configured to absorb above-ground impact force from reaching the underground asset, wherein the polymer layer has a width that extends substantially a width of the underground asset and a thickness between a top surface of the planar polymer layer and a bottom surface of the planar polymer layer, and wherein the polymer layer is a separate structure from the underground asset, wherein the underground asset is one or more of a fluid pipeline and a fluid storage vessel; and
    a sensor network comprising:
        one or more optical sources,
        one or more optical detectors,
        optical fibers embedded within the thickness of the polymer layer, wherein the optical fibers are one or more of woven into the protective mesh and embedded within respective polymer strands of the protective mesh, each optical fiber among the optical fibers comprising:
            an input end coupled to an optical source among the one or more optical sources, wherein the optical source is configured to provide an optical input signal to the input end,
            an output end coupled to an optical detector among the one or more optical detectors, wherein the optical detector is configured to detect an output optical signal from the output end and measure a light property of the output optical signal, and
            a fiber-optic sensor provided between the input end and the output end, wherein the fiber optic sensor is configured to modulate the light property of the output optical signal relative to the light property of the input optical signal as a function of a condition at the fiber optic sensor, and
            wherein the optical detector is configured to generate a sensor signal based on the light property measured for the optical fiber and representing the condition at the fiber optic sensor.

2. The system of claim 1, further comprising: a monitoring computing system in data communication with the one or more optical detectors, wherein the monitoring computing system is configured to receive the sensor signal from the optical detector, calculate a value of the condition at the fiber optic sensor based on the sensor signal, and output the value to an operator via one or more of: a visual display device, an audio output device and a communications interface.

3. The system of claim 2, wherein the monitoring computing system is configured to compare the value to a prescribed specification and generate an alert if the value represents a condition that is out of specification.

4. The system of claim 1, wherein the fiber-optic sensors comprise intrinsic fiber-optic sensors.

5. The system of claim 1, wherein the fiber optic sensors comprise one or more of: a pressure sensor, a temperature sensor, a humidity sensor, a strain sensor, a rotation sensor, an acceleration sensor, a pH sensor and a corrosion sensor.

6. The system of claim 1, wherein the sensor network further comprises a plurality of fiber optic data lines configured to transmit data along a length of the polymer layer.

7. The system of claim 1, wherein the polymer layer comprises a high-density polyethylene (HDPE) mesh.

8. The system of claim 1, wherein the optical fibers comprise data lines configured to transmit data along a length of the polymer layer.

9. A method of protecting an underground asset using a subsurface impact protection system, the method comprising:
    providing a subsurface impact protection system below a surface of the ground and above the underground asset, wherein the subsurface impact protection system comprises:
        an elongate planar subsurface polymer layer buried above the underground asset, wherein the polymer layer comprises a protective mesh including a plurality of polymer strands in a woven pattern configured to absorb above-ground impact force from reaching the underground asset, wherein the polymer layer has a width that extends substantially a width of the underground asset and a thickness between a top surface of the planar polymer layer and a bottom surface of the planar polymer layer, and wherein the polymer layer is a separate structure from the underground asset, wherein the underground asset is one or more of a fluid pipeline and a fluid storage vessel; and a sensor network comprising:
  one or more optical sources,
  one or more optical detectors,
  optical fibers embedded within the thickness of the polymer layer, wherein the optical fibers are one or more of: woven into the protective mesh and embedded within respective polymer strands of the protective mesh, each optical fiber among the optical fibers comprising:
    an input end coupled to an optical source among the one or more optical sources, wherein the optical source is configured to provide an optical input signal to the input end,
    an output end coupled to an optical detector among the one or more optical detectors, wherein the optical detector is configured to detect an output optical signal from the output end and measure a light property of the output optical signal, and
    a fiber-optic sensor provided between the input end and the output end, wherein the fiber optic sensor is configured to modulate the light property of the output optical signal relative to the light property of the input optical signal as a function of a condition at the fiber optic sensor, and
    wherein the optical detector is configured to generate a sensor signal based on the light property measured for the optical fiber and representing the condition at the fiber optic sensor; and
monitoring the polymer layer using the sensor network, wherein the monitoring step comprises:
  generating, using the one or more optical detectors monitoring the optical fibers sensors, a corresponding plurality of sensor signals of conditions respectively at the fiber optic sensors of the optical fibers; and
  transmitting the generated sensor signals to one or more external monitoring computing systems.

10. The method of claim 9, further comprising:
calculating with the one or more external monitoring system, values of the conditions respectively at the fiber optic sensors based on the plurality of sensor signals, and
outputting the values to an operator via one or more of: a visual display device, an audio output device and a communications interface.

11. The method of claim 10, further comprising: comparing the values to corresponding specifications and generating an alert if any of the values represent a condition that is out of specification.

12. The method of claim 9, wherein the fiber-optic sensors comprise intrinsic fiber-optic sensors.

13. The method of claim 9, wherein the fiber optic sensors comprise one or more of: a pressure sensor, a temperature sensor, a humidity sensor, a strain sensor, a rotation sensor, an acceleration sensor, a pH sensor and a corrosion sensor.

14. The method of claim 9, wherein the polymer layer comprises a plurality of interwoven high-density polyethylene (HDPE) strands.

15. The method of claim 9, and wherein the step of providing the subsurface impact protection system comprises:
  embedding the sensor network within the polymer layer during manufacture of the polymer layer, and
  delivering the polymer layer and embedded sensor network underground.

16. The method of claim 9, wherein the polymer layer comprises a mesh including a plurality of interwoven high-density polyethylene (HDPE) strands, and wherein the step of providing the subsurface impact protection system comprises:
  incrementally unrolling the polymer mesh from a roll,
  embedding the sensor network into the polymer mesh, and
  delivering the unrolled polymer mesh and embedded sensor network underground.

17. The method of claim 16, wherein the polymer mesh and the embedded sensor network is delivered underground using a trenchless delivery system.

18. The method of claim 16, wherein embedding the sensor network into the polymer mesh includes weaving the optical fibers into the protective mesh.

\* \* \* \* \*